US011775398B2

(12) United States Patent
Wang et al.

(10) Patent No.: US 11,775,398 B2
(45) Date of Patent: Oct. 3, 2023

(54) ROLLBACK OF SERVICES WITH A GLOBAL VARIABLE CHANGE

(71) Applicant: International Business Machines Corporation, Armonk, NY (US)

(72) Inventors: Yue Wang, Beijing (CN); Jing Jing Wei, Beijing (CN); Yingchun Guo, Beijing (CN); Shao Jun Ding, Beijing (CN); Jian Nan Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 17/490,196

(22) Filed: Sep. 30, 2021

(65) Prior Publication Data

US 2023/0095620 A1    Mar. 30, 2023

(51) Int. Cl.
G06F 11/14    (2006.01)
(52) U.S. Cl.
CPC ...... *G06F 11/1469* (2013.01); *G06F 2201/87* (2013.01)
(58) Field of Classification Search
CPC .................. G06F 11/1469; G06F 2201/87
See application file for complete search history.

(56) References Cited

U.S. PATENT DOCUMENTS 10,120,758 B2 * 11/2018 Hayashi ............ G06F 11/1471

FOREIGN PATENT DOCUMENTS

CN    111078468 A    4/2020
CN    111651244 A    9/2020

OTHER PUBLICATIONS

Pellegrini, A., Peluso, S., Quaglia, F., & Vitali, R. Transparent speculative parallelization of discrete event simulation applications using global variables. International Journal of Parallel Programming, 44(6), pp. 1200-1247. doi:http://dx.doi.org/10.1007/s10766-016-0429-2 (Year: 2016).*
"Apache ServiceComb-Pack", GitHub, Downloaded from the Internet on Jun. 17, 2021, 6 pgs., <https://github.com/apache/servicecomb-pack>.
Cui, "Applying the Saga Pattern with AWS Lambda and Step Functions", theburningmonk.com, Jul. 18, 2017, 9 pgs., <https://theburningmonk.com/2017/07/applying-the-saga-pattern-with-aws-lambda-and-step-functions/>.

(Continued)

*Primary Examiner* — Joseph R Kudirka
(74) *Attorney, Agent, or Firm* — David B. Woycechowsky

(57) ABSTRACT

Embodiments of the present disclosure relate to rollback of services with a global variable change. Embodiment techniques detect that at least two of a plurality of services in a transaction are executed to change a value of a first global variable. Tracing information is obtained to indicate a first order in which the at least two services change the value of the first global variable during execution of the plurality of services. In response to a failure of the transaction, a rollback execution plan for a plurality of compensating services is determined at least based on the tracing information, where the plurality of compensating services are configured to compensate for the plurality of services respectively. The plurality of compensating services subsequently executed according to the rollback execution plan.

20 Claims, 21 Drawing Sheets

(56) References Cited

OTHER PUBLICATIONS

Fernando, "Practical Transaction Handling in Microservice Architecture", DZone, Microservices Zones, Dec. 1, 2020, 16 pgs., <https://dzone.com/articles/practical-transaction-handling-in-microservice-arc>.

Ganapathy, "Handling Distributed Transactions in the Microservice World", The Startup, Medium, May 11, 2019, 9 pgs., <https://medium.com/swlh/handling-transactions-in-the-microservice-world-c77b275813e0>.

Mell et al., The NIST Definition of Cloud Computing, National Institute of Standards and Technology, U.S. Department of Commerce, NIST Special Publication 800-145, Sep. 2011, 7 pages.

Minkowski, "Distributed Transactions in Microservices with Spring Boot", Microservices, Jun. 19, 2020, 16 pgs, <https://piotrminkowski.com/2020/06/19/distributed-transactions-in-microservices-with-spring-boot/>.

Riandy, "Distributed Sagas for Microservices", DZone, Microservices Zone, Feb. 22, 2018, 14 pgs., <https://dzone.com/articles/distributed-sagas-for-microservices>.

Richardson, "Pattern: Saga", Microservice Architecture, Mar. 18, 2021, 4 pgs., Copyright @ 2020 Chris Richardson, <https://microservices.io/patterns/data/saga.html>.

Singh, et al., "Solving Distributed Transaction Management Problem in Microservices Architecture Using Saga", IBM Developer, Sep. 17, 2020, 10 pgs., <https://developer.ibm.com/depmodels/microservices/articles/use-saga-to-solve-distributed-transaction-management-problems-in-a-microservices-architecture/>.

Xiang, "Patterns for Distributed Transactions Within a Microservices Architecture", Red Hat Developer, Oct. 1, 2018, 15 pgs., <https://developers.redhat.com/blog/2018/10/01/patterns-for-distributed-transactions-within-a-microservices-architecture/>.

\* cited by examiner

| SEGMENT NAME | GLOBAL VAR. | PREVIOUS SEGMENT | COMPENSATE FOR |
|---|---|---|---|
| SERVICE_D_C_P1 | N/A | N/A | SERVICE_D_P3 (21,30) |
| SERVICE_D_C_P2 | X | SERVICE_D_C_P1 | SERVICE_D_P2 (11,20) |
| SERVICE_D_C_P3 | N/A | SERVICE_D_C_P2 | SERVICE_D_P1 (1,10) |

| SEGMENT NAME | GLOBAL VAR. | PREVIOUS SEGMENT | COMPENSATE FOR |
|---|---|---|---|
| SERVICE_E_C_P1 | N/A | N/A | SERVICE_E_P3 (21,30) |
| SERVICE_E_C_P2 | X | SERVICE_E_C_P1 | SERVICE_E_P2 (11,20) |
| SERVICE_E_C_P3 | N/A | SERVICE_E_C_P2 | SERVICE_E_P1 (1,10) |

| TIME | SERVICE NAME | LINE | GLOBAL VAR. | GLOBAL VAR RESULT | MESSAGE |
|---|---|---|---|---|---|
| T2 | SERVICE_E | 3 | N/A | N/A | METHOD ENTER |
| T3 | SERVICE_D | 3 | N/A | N/A | METHOD ENTER |
| T4 | SERVICE_D | 15 | X | UPDATED | GLOBAL_VAR_X CHANGED |
| T5 | SERVICE_E | 16 | X | UPDATED | GLOBAL_VAR_X CHANGED |

522

| ID | SEGMENT/SERVICE NAME | PREVIOUS SEGMENT/SERVICE |
|---|---|---|
| 1 | SERVICE_D_C_P1 | N/A |
| 2 | SERVICE_E_C_P1 | N/A |
| 3 | SERVICE_E_C_P2 | SERVICE_E_C_P1 |
| 4 | SERVICE_D_C_P2 | SERVICE_D_C_P1, SERVICE_E_C_P2 |
| 5 | SERVICE_D_C_P3 | SERVICE_D_C_P2 |
| 6 | SERVICE_E_C_P3 | SERVICE_E_C_P2 |
| 7 | SERVICE_B_C | SERVICE_D_C_P3 |
| 8 | SERVICE_C_C | SERVICE_E_C_P3 |
| 9 | SERVICE_A_C | SERVICE_B_C, SERVICE_C_C |

| ID | SEGMENT/SERVICE NAME | PREVIOUS SEGMENT/SERVICE |
|---|---|---|
| 1 | SERVICE_D_C_P1 | N/A |
| 2 | SERVICE_E_C_P1 | N/A |
| 3 | SERVICE_E_C_P2 | SERVICE_E__C_P1 |
| 4 | SERVICE_D_C_P2 | SERVICE_D_C_P1, SERVICE_E_C_P2 |
| 5 | SERVICE_D_C_P3 | SERVICE_D_C_P2 |
| 6 | SERVICE_E_C_P3 | SERVICE_E_C_P2 |
| 7 | SERVICE_D_C_P4 | SERVICE_D_C_P3 |
| 8 | SERVICE_E_C_P4 | SERVICE_E_C_P3 SERVICE_D_C_P4 |
| 9 | SERVICE_D_C_P5 | SERVICE_D_C_P4 |
| 10 | SERVICE_E_C_P5 | SERVICE_E_C_P4 |
| 11 | SERVICE_B_C | SERVICE_D_C_P3 |
| 12 | SERVICE_C_C | SERVICE_E_C_P3 |
| 13 | SERVICE_A_C | SERVICE_B_C, SERVICE_C_C |

| ID | SEGMENT/SERVICE NAME | PREVIOUS SEGMENT/SERVICE |
|---|---|---|
| 1 | SERVICE_D_C_P1 | N/A |
| 2 | SERVICE_E_C_P1 | N/A |
| 3 | SERVICE_E_C_P2 | SERVICE_E__C_P1 |
| 4 | SERVICE_D_C_P2 | SERVICE_D_C_P1, SERVICE_E_C_P2 |
| 5 | SERVICE_D_C_P3 | SERVICE_D_C_P2 |
| 6 | SERVICE_E_C_P3 | SERVICE_E_C_P2 |
| 7 | SERVICE_D_C_P4 | SERVICE_D_C_P3 |
| 8 | SERVICE_E_C_P4 | SERVICE_E_C_P3 SERVICE_D_C_P4 |
| 9 | SERVICE_D_C_P5 | SERVICE_D_C_P4 |
| 10 | SERVICE_E_C_P5 | SERVICE_E_C_P4 |
| 11 | SERVICE_B_C | SERVICE_D_C_P3 |
| 12 | SERVICE_C_C | SERVICE_E_C_P3 |
| 13 | SERVICE_A_C | SERVICE_B_C, SERVICE_C_C |

FIG. 14C

ROLLBACK OF SERVICES WITH A GLOBAL VARIABLE CHANGE

BACKGROUND

The present disclosure generally relates to distributed computing data consistency techniques and more particularly, to data rollbacks for global variables in multi-service settings.

It is becoming increasingly more common that service implementation involves multiple serial and/or parallel calls to other services in distributed systems. A transaction may be designed to include a plurality of services among which the serial and/or parallel calls are possible. These service calls can be successful, can fail due to some errors, or can go into an unknown state due to timeout, in which case the transaction may succeed or fail. In the distributed systems, transactions spanning multiple services require a mechanism to ensure data consistency across the services, especially when the transactions are failed. Typically, a rollback mechanism for managing failure is to provide each service of a transaction with a compensating service for rollback, so as to ensure consistency and correctness across the services of the transaction.

SUMMARY

According to one embodiment of the present disclosure, there is provided a computer-implemented method. According to the method, it is detected that at least two of a plurality of services in a transaction are executed to change a value of a first global variable. Tracing information is obtained to indicate a first order in which the at least two services change the value of the first global variable during execution of the plurality of services. In response to a failure of the transaction, a rollback execution plan for a plurality of compensating services is determined based on the tracing information, where the plurality of compensating services are configured to compensate for the plurality of services respectively. The plurality of compensating services are caused to be executed according to the rollback execution plan.

According to a further embodiment of the present disclosure, there is provided a system. The system comprises a processing unit; and a memory coupled to the processing unit and storing instructions thereon. The instructions, when executed by the processing unit, perform acts of any one of the above methods according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform any one of the above methods according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 11 depicts an example of a rollback execution plan in accordance with some embodiments of the present disclosure.

FIG. 13C depicts an example of a rollback execution plan in accordance with some other embodiments of the present disclosure.

FIG. 14C depicts an example of a rollback execution plan in accordance with some further embodiments of the present disclosure.

DETAILED DESCRIPTION

Figure 1:
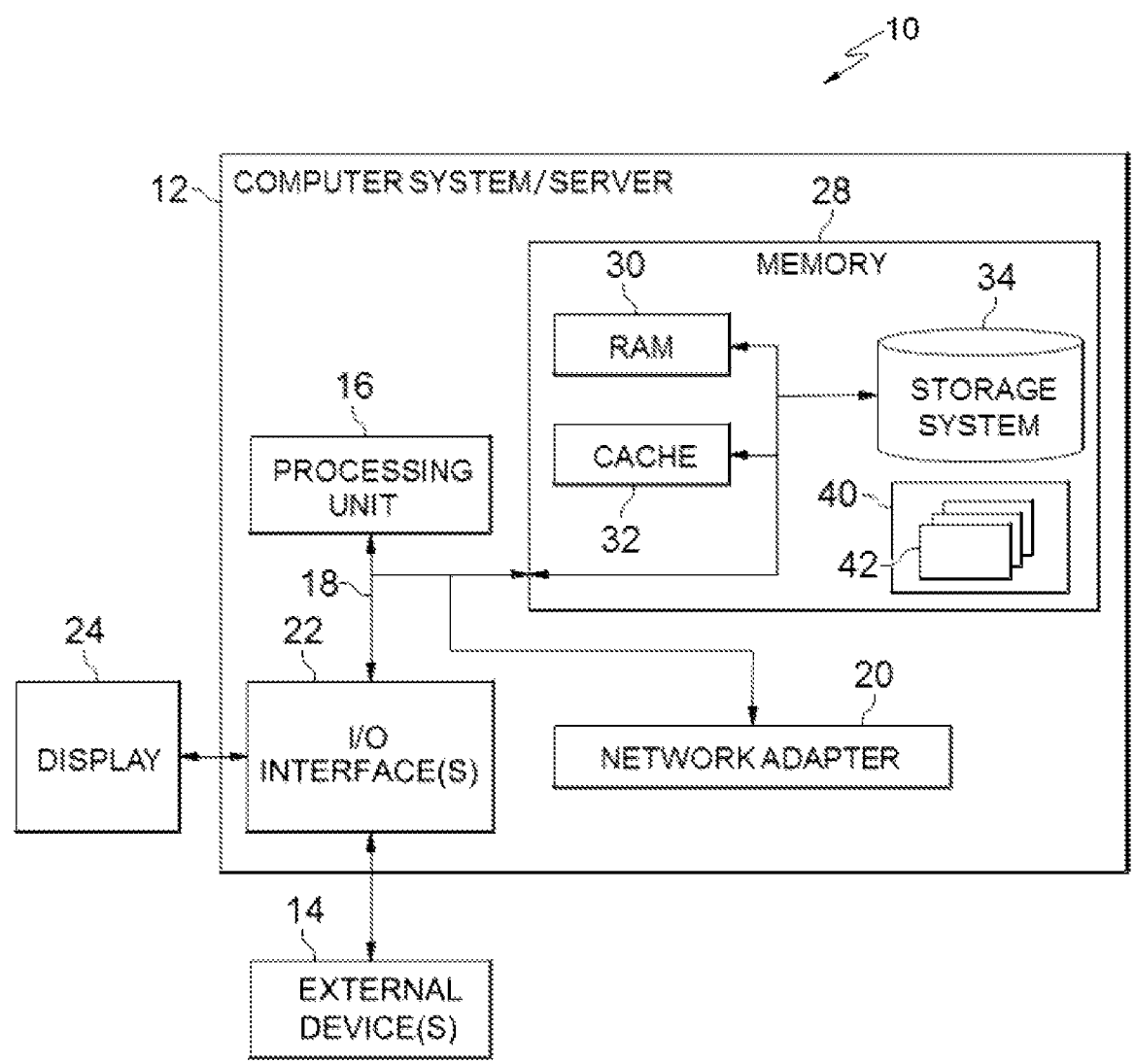
FIG. 1 depicts a cloud computing node in accordance with some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
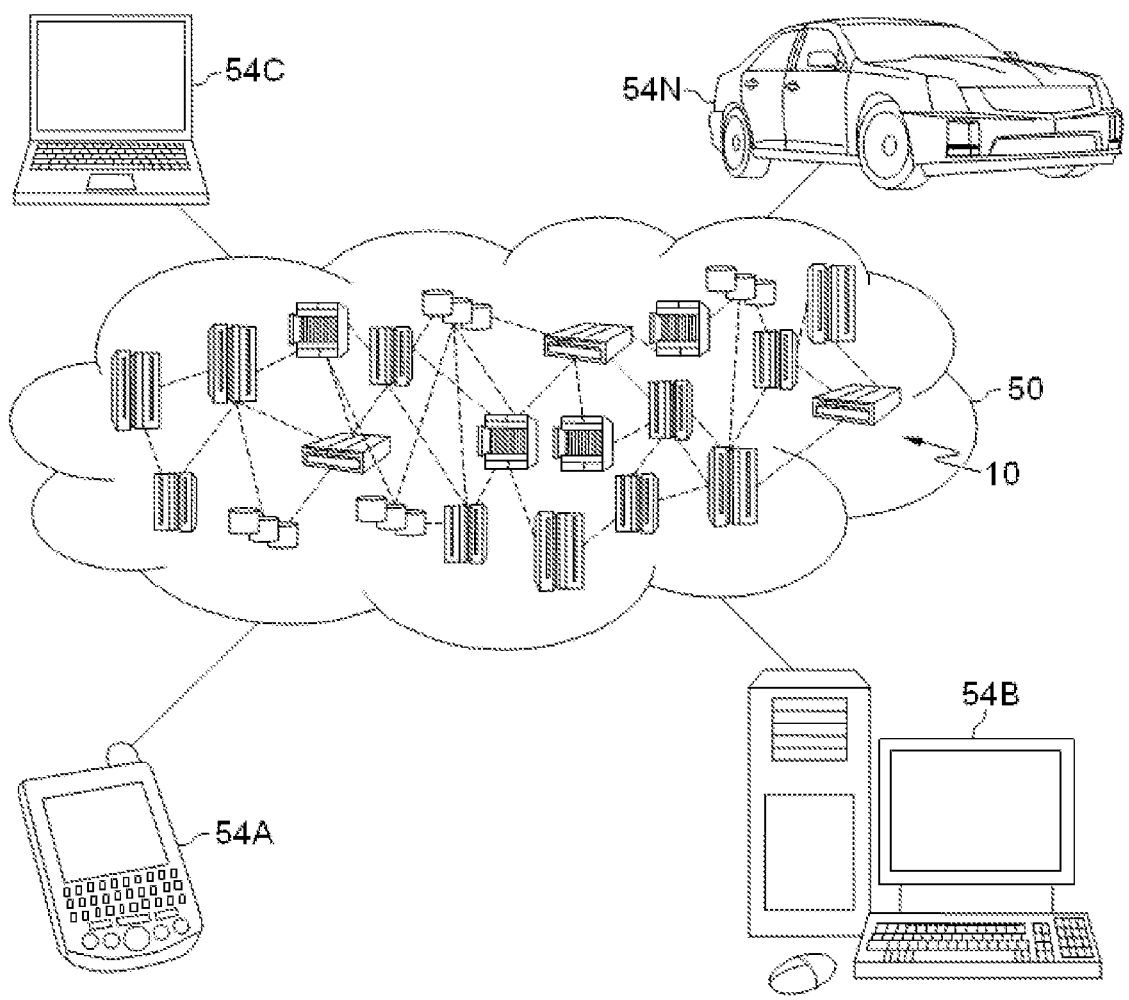
FIG. 2 depicts a cloud computing environment in accordance with some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
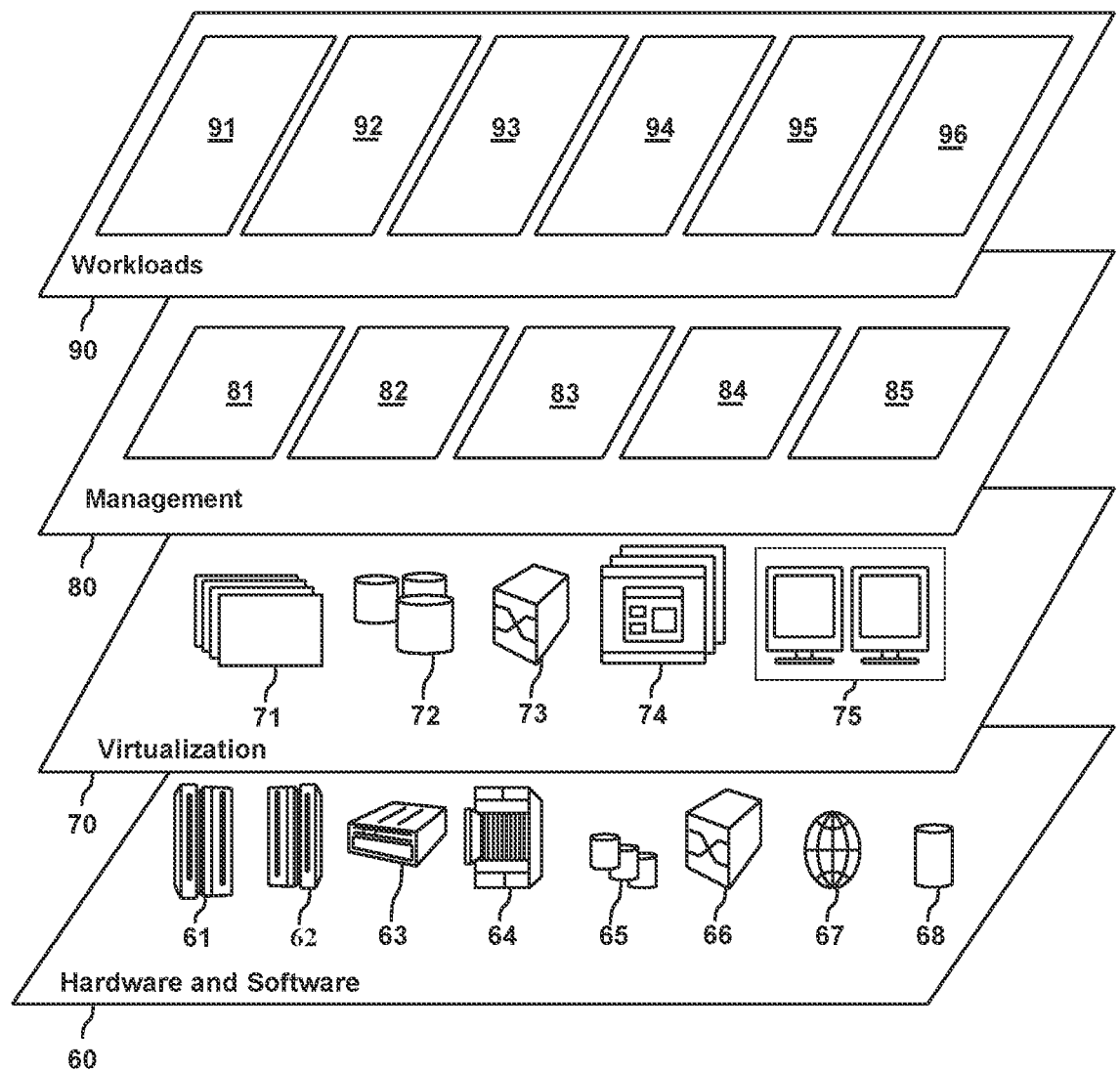
FIG. 3 depicts abstraction model layers in accordance with some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service rollback 96. The functionalities of service rollback 96 will be described in the following embodiment of the present disclosure.

In distributed systems, transactions spanning multiple services require a mechanism to ensure data consistency across the services. The distributed "saga" pattern is a pattern for managing failures, where each action has a compensating action for rollback, which may help ensure consistency and correctness across services. A "saga" represents a high-level business process that consists of several low-level requests that each update data within a single service. Each service has a compensating service that is executed when the service fails or the saga is aborted.

As used herein, the term "service" refers to any type of software program or collection of software modules providing some functionality. As used herein, the term "transaction" refers to a high-level service comprising that consists of several low-level services that each update data within a single service. A transaction thus may comprise a plurality of services, which may be considered as a saga. In some cases, a transaction with multiple services may be referred to as a macro-transaction and the services may be referred to as micro-transactions. In some cases, the "transaction" may be referred to as a service while the "services" comprised in the transaction may then be referred to as micro-services.

As mentioned above, a rollback mechanism is needed in order to manage failure in a transaction with distributed services. Typically, once a transaction is started, data may be accessed and modified by the execution of those services. Rolling back a transaction is to undo any changes so that the data modified in execution can be reverted to the values they had before the start of the execution. Individual compensating services may be provided to implement the rollback for the services.

Figure 4A:
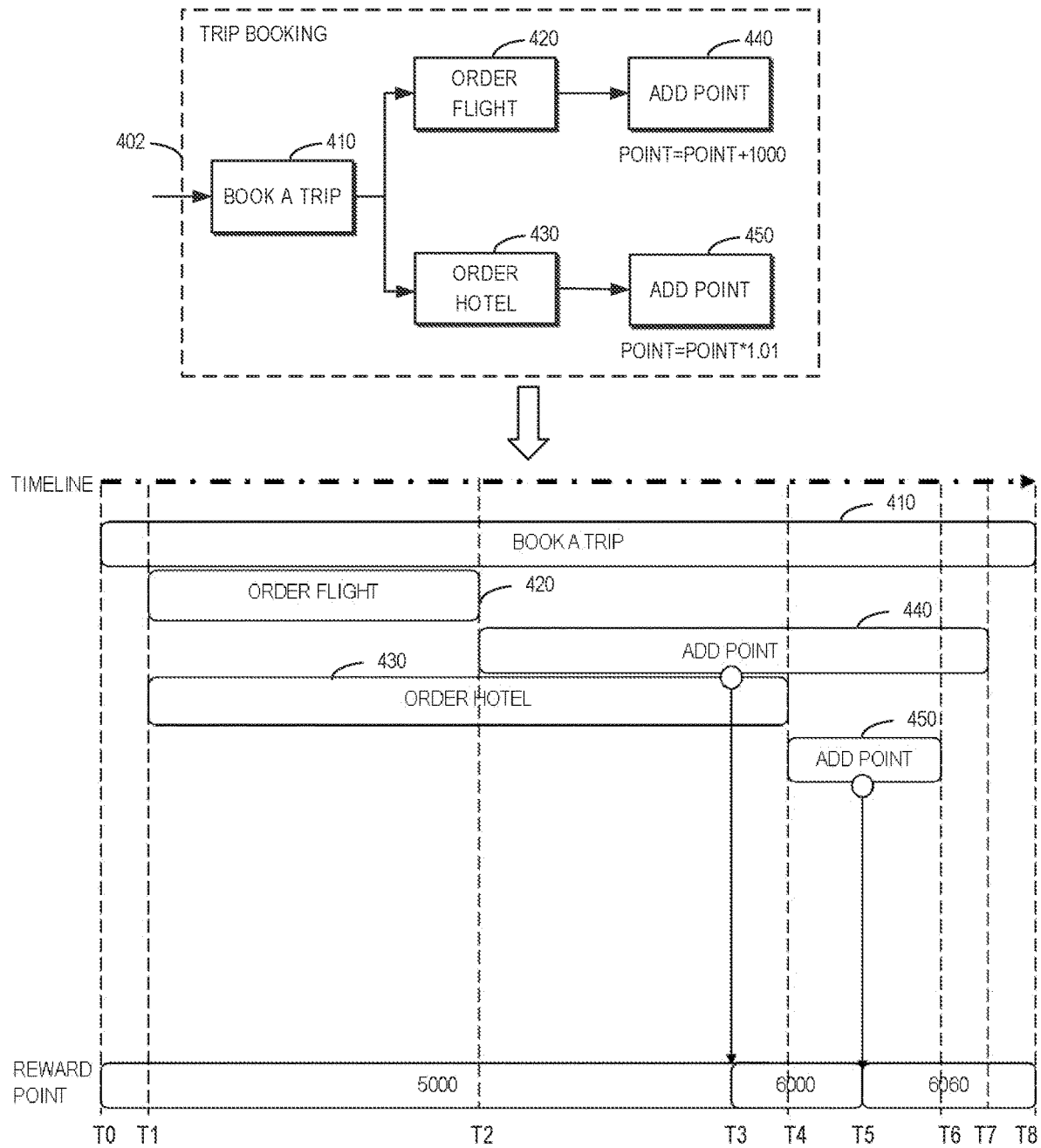
FIG. 4A and FIG. 4B depict some examples of execution and rollback of a transaction with a same global variable.
Figure 4B:
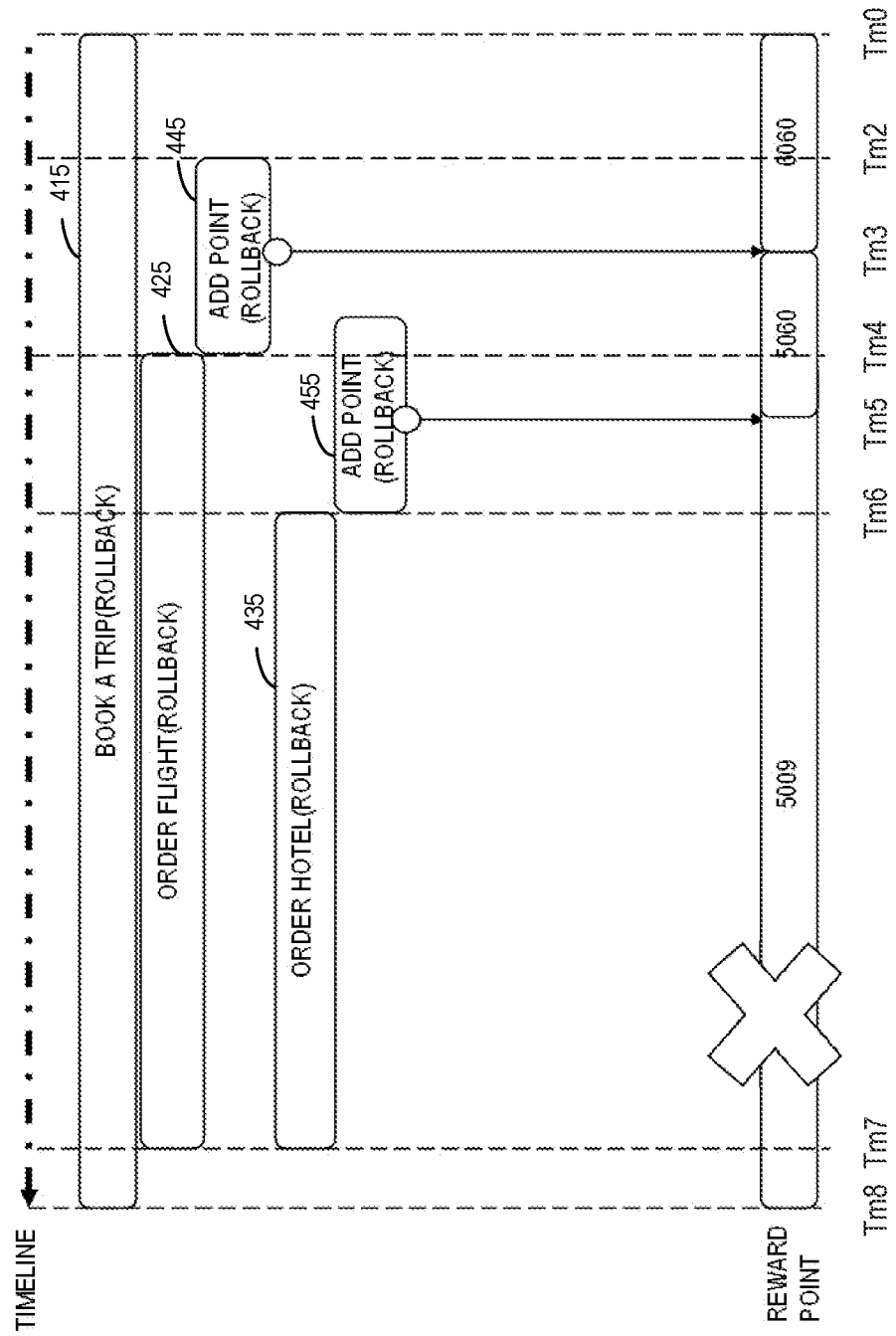

The traditional rollback processes are performed based on the service level. However, in some cases the rollback result may be incorrect if two or more services are executed to change a same variable. FIG. 4A and FIG. 4B illustrate some examples of execution and rollback of a transaction with the same global variable. A global variable is a variable with global scope that is visible and/or accessible throughout multiple services (or multiple microservices within a single service).

As illustrated, an example transaction 402 of "trip booking" comprises multiple services, including a service 410 of "book a trip" to start the transaction, a service 420 of "order flight" to order a flight, a service 430 of "order hotel" to order a hotel, a service 440 of "add point" to add a reward point of an account after the flight is ordered, and a service 450 of "add point" to add the reward point of the account after the hotel is ordered. The service 440 of "add point" is configured to increase the reward point by 1000, and the service 450 of "add point" is configured to weight the reward point by a factor of "1.01."

FIG. 4A illustrates respective time spans of the services of the transaction during the execution of the transaction. The service 410 is started at T0 and the services 420 and 430 are then invoked at T1 by the service 410 in parallel to order a flight and a hotel, respectively. The execution of the services 420 and 430 may last for durations. In the illustrated of FIG. 4A, the execution of the service 420 is completed first at T2. Once the service 420 is completed, the service 440 is invoked and executed to update the global variable "reward point" from its initial value of "5000" to "6000" at T3. The execution of the service 440 is completed at T7. The execution of the service 430 is completed at T4 which is later than the completion time (T2) of the service 420. Once the service 430 is completed, the service 450 is invoked and executed to change the global variable "reward point." Since the global variable "reward point" has been updated by the service 440 to have the value of "6000," the service 450 may continue to update the value of "6000" to "6060" at T5. The execution of the service 450 is completed at T6. After the services 420, 430, 440, and 450 are all completed, the service 410 is completed at T8.

In some cases, if the transaction 402 is failed (or aborted), a rollback of the transaction 402 may be performed by executing compensating services for the services comprised in the transaction 402. As illustrated in FIG. 4B, the rollback of the transaction 402 is started at Tm0 (note that the timeline is from the right to the left). A rollback 445 of the service 440 of "add point" is started at Tm2 and the global variable "reward point" is changed from "6060" to "5060" at Tm3 by undoing the operation of the service 440 (e.g., undoing the weighting). The rollback 445 is completed at Tm4 and then a rollback 425 of the service 420 of "order flight" is invoked. A rollback 455 of the service 450 of "add point" is also started and the global variable "reward point" is changed at Tm5 which is later than Tm3. Thus, the global variable "reward point" is changed from "5060" to "5009" by undoing the operation of the service 450 (e.g., undoing the increase). The rollback 455 is completed at Tm6 and then a rollback 435 of the service 430 of "order hotel" is invoked. After the rollbacks 425 and 435 of the services 420 and 430 are completed at Tm7, the whole rollback 415 of the service 410 of "book a trip" is completed.

However, after the rollback, the value of the global variable "reward point" is not changed to its initial value of "5000" when the transaction 402 is started. The reason is that the global variable is first changed in the rollback 445 of the service 450 and then changed in the rollback 440 of the service 440 during the rollback process. According to the execution order of services 440 and 450 in FIG. 4A, the correct order to undoing the changes is to first change the global variable "reward point" by undoing the operation by the service 450 and then change the global variable later by undoing the operation by the service 440.

Since the services 420, 440 and the services 430, 450 are executed in parallel, their execution may last for different duration and completed at different times depending on, for example, the tasks performed during execution and the corresponding resources available for the two services. Thus, although the service 450 is invoked to change the global variable before the service 440 in the example of FIG. 4A, in other cases, the service 420 may be completed prior to the service 430 and then the service 440 may be invoked to change the global variable before the service 450. Therefore, the changes made by different services to a same global variable may be applied in different orders in different cases.

It is of great importance to keep track of the global variable. If the transaction fails, it always is needed to roll back to a previous consistent state, that is, to revert to an initial value when the transaction is started. Without controlling the rollback sequence of the changes made to the global variable carefully, it is possible that the global variable may not be reverted back to its initial state when rolling back a transaction, which is undesirable.

According to example embodiments of the present disclosure, there is proposed a solution for rollback of services with a global variable change. In this solution, if two or more services of a transaction are executed to change a same global variable, an order in which the two or more services change the value of the global variable is tracked during execution of the services of the transaction. In the case of a failure of the transaction, a rollback execution plan is determined for a plurality of compensating services based on the tracked order. The plurality of compensating services are executed according to the rollback execution plan.

By tracking the order of changes made to the global variable during the execution of the services, it is possible to control the rollback sequence of the compensating services based on the timing that the global variable is modified. As such, the global variable can be correctly reverted back to its initial state.

Other advantages of the present disclosure will be described with reference to the example embodiments and the accompanying drawings below.

Figure 5:
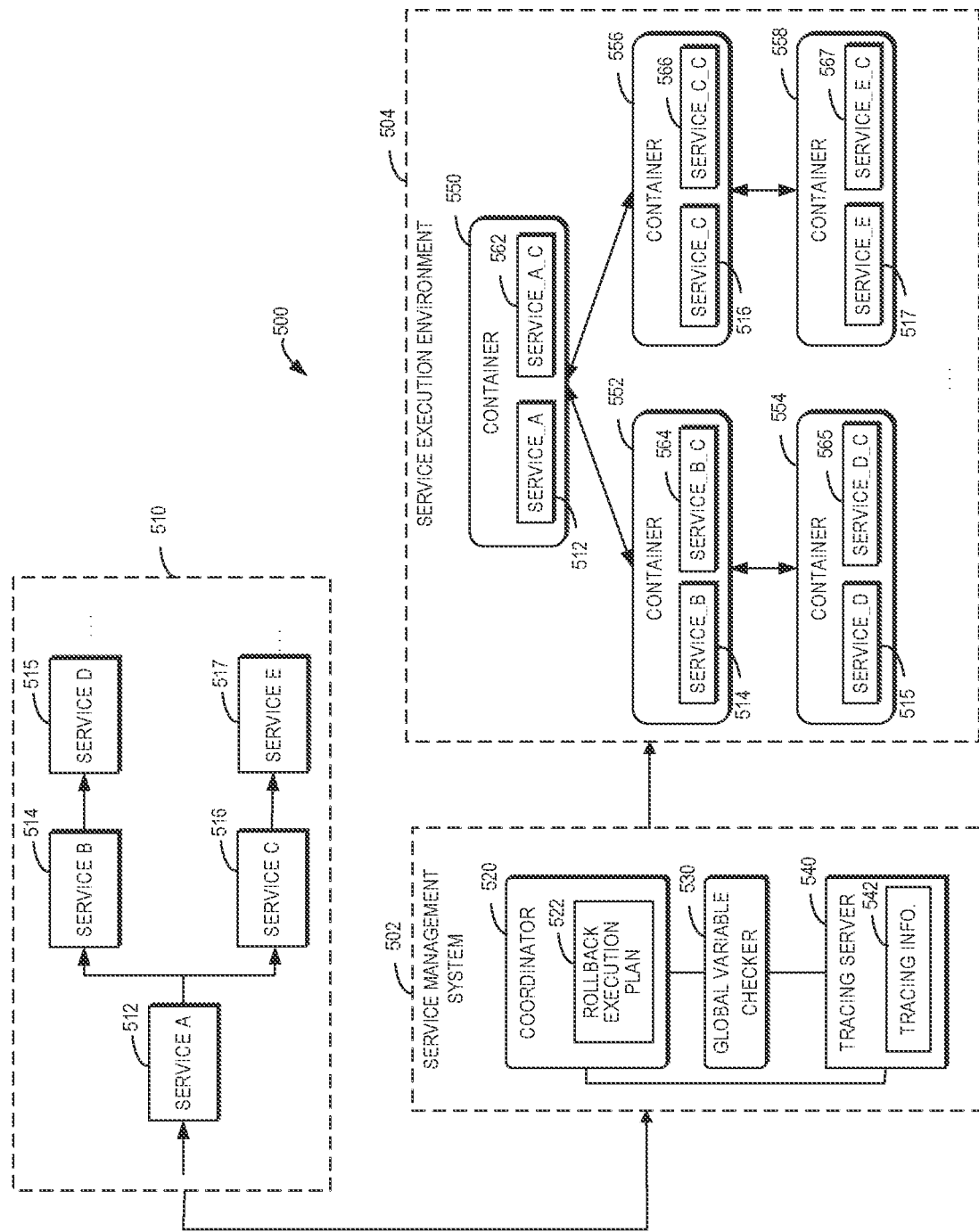
FIG. 5 depicts a block diagram of computing architecture in accordance with some embodiments of the present disclosure.

Reference is now made to FIG. 5, which illustrates a block diagram of computing architecture 500 in accordance with some embodiments of the present disclosure.

As illustrated, in the computing architecture 500, a service management system 502 is configured to control and manage deployment, execution, and rollback of services of transactions. For the purpose of illustration, an example transaction 510 is shown. As illustrated, the transaction 510 comprises a plurality of services, including a service 512 (represented as "Service_A), a service 514 (represented as "Service_B), a service 516 (represented as "Service_C), a service 515 (represented as "Service_D), and a service 517 (represented as "Service_E). Those services of the transaction 510 may be deployed to the service execution environment 504 for execution. A service of the transaction 510 may make multiple serial and/or parallel calls to one or more other services. For example, the service 512 may make parallel calls to the services 514 and 516, and the services 514 and 515 may be executed in serial.

It would be appreciated that the transaction 510 is provided as an example. In some examples, the service 512 may make parallel calls to more than two services or make a call to one service. In some examples, one or more of the services 514, 515, 516, and 517 may make serial and/or parallel calls to one or more other services.

In some embodiments, the service management system 502 may deploy the respective services of the transaction 510 into a service execution environment 504, for example, in response to a user request or in response to other events. The service execution environment 504 may include various infrastructure devices to provide a pool of physical resources for supporting services executing thereon. The resources provided in the service execution environment 504 may include processing resources, memory, storage, network resources, and/or the like. In some embodiments, the service execution environment 504 may be a cloud computing environment, such as a public cloud or a private cloud.

The service management system 502 comprises a coordinator 520 configured to deploy the respective services of the transaction 510 in a distributed manner in the service execution environment 504. As a specific example, the services of the transaction 510 may be deployed in the service execution environment 504 based on containers. As illustrated in FIG. 5, the service 512 is deployed in a container 550, the service 514 is deployed in a container 552, the service 515 is deployed in a container 554, the service 516 is deployed in a container 556, and the service 517 is deployed in a container 558. In some examples, depending on the deployment requirements and the configuration of the service management system 502, one or more containers may be initiated and form a pod for one or more services to run therein. In some examples, the services implemented in the containers of the service execution environment 504 may be communicated with each other, for example, through proxies provisioned in the containers and application programming interfaces (APIs) configured for the services. It would be appreciated that in other implementations, the services may not be deployed on the basis of containers and thus no containers are included in the service execution environment 504.

The distributed implementation of the transaction 510 may be referred to as a saga pattern. In some embodiments, during operation, the services of the transaction 510 may be executed in a command/orchestration mode, where the coordinator 520 is configured for centralizing the decision making and sequencing logic among the services. In some embodiments, during operation, the services of the transaction 510 may be executed in an event-driven choreography, where there is no central coordination, and each service is running and listens to events from other services to determine if an action is to be taken or not.

In accordance with example embodiments of the present disclosure, the service management system 502 is further configured to implement a rollback mechanism for transactions, e.g., the transaction 510. As illustrated in FIG. 5, in addition to the coordinator 520, the service management system 502 further comprises a global variable checker 530 and a tracing server 540.

The global variable checker 530 is configured to detect whether there is one or more global variables in the transaction 510. As used herein, a global variable refers to a variable whose value is to be changed by two or more services of a transaction. Such a variable may be defined depending on the services and transactions. In some embodiments, the global variable checker 530 may detect such a global variable(s) by checking codes or deployment specifications of the respective services of the transaction 510. The global variable checker 530 may perform the checking of the global variable(s) when the transaction 510 is to be deployed, during the deployment, or after the deployment is completed.

If one or more global variables are detected, the tracing server 540 is configured to collect tracing information 542 during the execution of the services of the transaction 510. In some embodiments, the tracing server 540 may communicate with the containers in which the services are deployed or communicate with the proxies (if available) in the containers, to collect the tracing information 542. In particular, for a detected global variable in the transaction 510, the collected tracing information 542 may be used to determine or indicate an order in which the two or more services of the transaction 510 change the value of the global variable during execution of the services. If more than one global variable is detected, the tracing server 540 may be configured to obtain the tracing information for each global variable. In some embodiments, the tracing information 542 may indicate the timing of the changes made by the two or more services to the global variable(s) during the execution.

The services of the transaction 510 in the service execution environment 504 may be executed in response to requests from users, other services, and/or other events.

Since the transaction 510 may not always be completed successfully each time, to ensure data consistency across the services, the tracing information 542 related to the detected global variable(s) may be collected for use in a rollback of the transaction 510.

The coordinator 520 is configured to generate a rollback execution plan 522 at least based on the tracing information 542 in the case of a failure of the transaction 510. To support the rollback of the transaction 510, a plurality of compensating services are configured to compensate for the plurality of services of the transaction 510, respectively. The rollback execution plan 522 indicates how the plurality of compensating services are executed when performing a rollback for the transaction 510. The compensating services are also deployed in the service execution environment 504 for execution.

As illustrated, a compensating service 562 (represented as "Service_A_C") is deployed to compensate for the service 512, where "C" denotes "compensating" here. The compensating service 562 may be deployed in the container 550 with the service 512. A compensating service 564 (represented as "Service_B_C") is deployed to compensate for the service 514 and may be deployed in the container 552. A compensating service 566 (represented as "Service_C_C") is deployed to compensate for the service 516 and may be deployed in the container 556. A compensating service 565 (represented as "Service_D_C") is deployed to compensate for the service 515 and may be deployed in the container 554. A compensating service 567 (represented as "Service_E_C") is deployed to compensate for the service 517 and may be deployed in the container 558.

It would be appreciated that although the compensating services are illustrated in FIG. 5 to be deployed within the same containers with the services of the transaction, they may be deployed in separated containers in other embodiments.

As the tracing information obtained during the execution of the services indicate the order(s) in which the two or more services of the transaction 510 change the value(s) of the global variable(s) during each time of execution, the rollback execution plan 522 may be generated to specify an execution order of the compensating services. In some embodiments, for a global variable, the rollback execution plan 522 may be generated to specify an order in which two or more compensating services are executed to change the value of the first global variable. The two or more compensating services are those that are configured to compensate for the two or more services of the transaction 510 in which the global variable is detected. The changes made to the global variable by the two or more compensating services may be specified in the rollback execution plan 522 to be in reverse order with the changes made to the global variable by the corresponding services of the transaction 510. As such, according to the rollback execution plan, the changes made to each global variable can be undone in sequence.

With the rollback execution plan 522 generated, the coordinator 520 is configured to cause the compensating services to be executed in the service execution environment 504 according to the rollback execution plan 522. The compensating services may then be controlled to execute in an order as specified by the rollback execution plan 522. By use of the tracing information 542 collected during the execution of the services, the execution order of the compensating services can be well controlled to achieve correct rollback for the global variable(s). As such, the transaction 510 can be rolled back to the initial state correctly.

It would be appreciated that the service management system 502 may be implemented by one or more computing systems or devices having computing and storage capability. For example, the service management system 502 may be implemented by one or more computing platforms, servers, mainframes, general-purpose computing devices, a cloud environment, and/or the like.

It would also be appreciated that the components of the service management system 502 shown in FIG. 5 may be implemented as one or more software engines, components, or the like, which are configured with logic for implementing the functionality attributed to the particular module. Each component may be implemented using one or more of such software engines, components or the like. The software engines, components, and the like are executed on one or more processors of one or more computing systems or devices and utilize or operate on data stored in one or more storage devices, memories, or the like, on one or more of the computing systems. In some embodiments, the coordinator 520 may be implemented in an ingress gateway to the service execution environment 504. In some embodiments, the global variable checker 530 may be implemented as a function as a service (FaaS) master. Although illustrated separately, the service management system 502 may be implemented in a same computing environment with the service execution environment 504, for example, in a cloud environment.

In some embodiments, in order to control the sequence of changes applied to a global variable in a finer fashion, one or more compensating services may be generated to comprise service segments that can be invoked independently. One or more compensating services may be defined in this way, to compensate for the services that change the value(s) of the global variable(s). Some detailed embodiments will be discussed above. In some embodiments, the generation, deployment, and/or management of the compensating services may be performed by the coordinator 520.

Among the services 512, 514, 515, 516, and 517 of the transaction 510, it is assumed that the services 515 and 517 ("Service_D" and "Service_E") are executed to change a value of a same global variable (represented as a global variable "x") in some examples. In some other examples, two or more services among the services 512, 514, 515, 516, and 517 may be executed to change values of one or more further global variables, and example embodiments of which will also be illustrated later.

To generate the compensating services 565 and 567 for the services 515 and 517, each of the services 515 and 517 may be divided into a sequence of service segments based on a location of a code snippet which is executable to change the value of the global variable "x." Then, each of the compensating services 565 and 567 may be generated to include a sequence of compensating service segments to compensate for the sequence of service segments of the corresponding service, respectively. The sequence of compensating services may be invoked independently during execution.

Figure 6A:
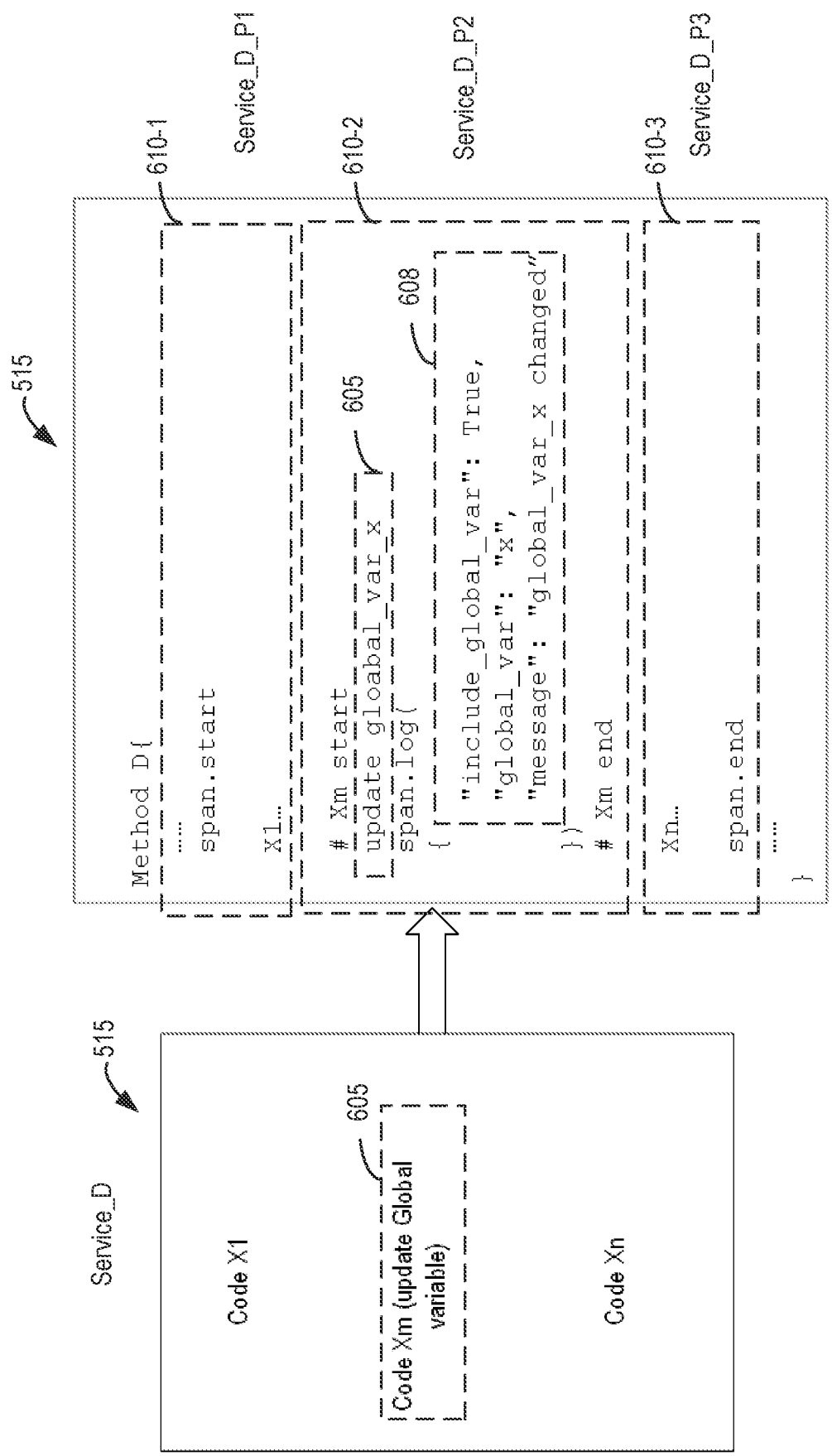
FIG. 6A depicts an example division of a service in accordance with some embodiments of the present disclosure.
Figure 6B:
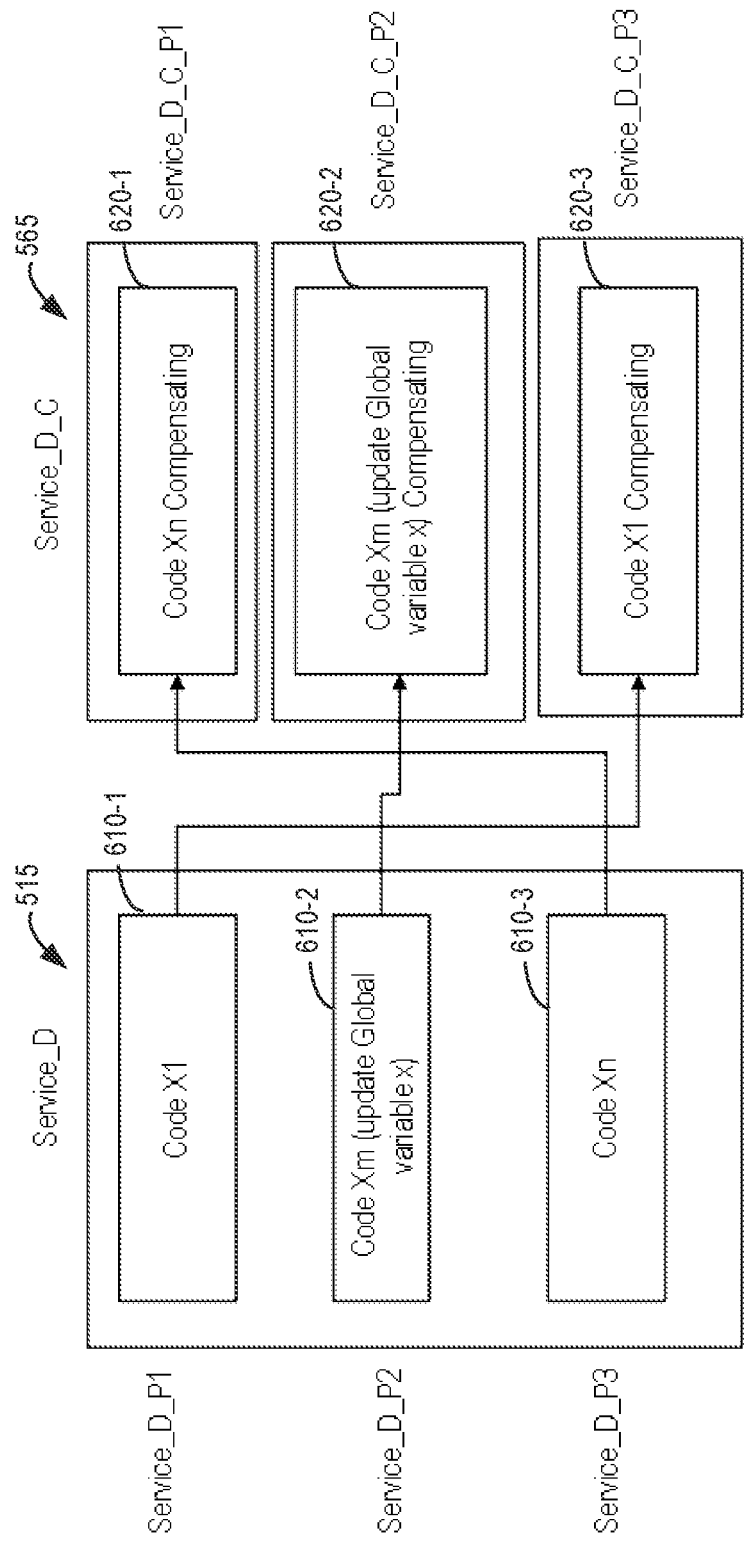
FIG. 6B depicts an example correlation between service segments and compensating service segments in accordance with some embodiments of the present disclosure.

The generation of the compensating service 515 is illustrated in FIG. 6A and FIG. 6B. FIG. 6A depicts an example division of the service 515 in accordance with some embodiments of the present disclosure. The global checker 530 may detect, from the code of the service 515, a code snippet 605 that is executable to change the value of the global variable "x." The global checker 530 may inform the coordinator 520 the result of the detecting. The coordinator 520 may divide the service 515 into a sequence of service segments 610-1, 610-2, and 610-3, represented as "Service_D_P1," "Service_D_P2," and "Service_D_P3," as illustrated in FIG. 6A. Those service segments 610-1, 610-2, and 610-3 may sometimes be collectively or individually referred to as service segments 610. The service segment 610-2 comprises the code snippet 605 and thus may be executed to change the value of the global variable "x."

In some embodiments, the service segments 610-1, 610-2, and 610-3 may be divided in a sequence from the beginning to the end of the code for the service 515. The division may be performed based on a location of the code snippet 605. In some embodiments, the service segments 610-1, 610-2, and 610-3 may be determined in such a way that the code snippets comprised in the individual service segments can be executable when being invoked. In some examples, the service segment 610-2 is identified from the code of the service 515, and the remaining code snippet preceding the service segment 610-2 may form the service segment 610-1 and the remaining code snippet following the service segment 610-2 may form the service segment 610-3.

In some embodiments, to identify start and end boundaries of each service segment 610, labels of a span of the service segment 610 may be marked in the code of the service 515. In some embodiments, to facilitate the collection of the tracing information 542, a set of statements 608 may be added to the service segment 610-2, to state that this service segment 610-2 includes a global variable which is "x." According to the set of statements 608, a message "global_var_x changed" may be generated as an output when the service segment 610-2 is executed.

It would be appreciated that service segments of a service may be divided in a finer granularity than the one in the example illustrated with respect to the service 515. In some examples, if a service includes a plurality of code snippets that are executable to change a value of a global variable for multiple times and/or if a service is executed to change values of two or more global variables, a larger number of service segments may be divided for generating the corresponding compensating service segments. Such examples will be illustrated and described in the following embodiments.

To generate the compensating service 565 for the service 515, as illustrated in FIG. 6B, a sequence of compensating service segments 620-1, 620-2, and 630-3 may be included in the compensating service 565, represented as "Service_D_P1", "Service_D_C_P2," and "Service_D_C_P3." The compensating services 620-1, 620-2, and 630-3 may sometimes be collectively or individually referred to as compensating service segments 620.

The compensating service 620-1 is configured to compensate for the service segment 610-3, the compensating service 620-2 is configured to compensate for the service segment 610-2, and the compensating service 620-3 is configured to compensate for the service segment 610-1. The compensating service segments 620-1, 620-2, and 620-3 are arranged in the compensating service 565 in reverse order with respect to the service segments 620-3, 620-2, and 620-1 in the service 515. With such arrangement, the compensating service segments 620-1, 620-2, and 620-3 may be invoked in the sequential order as arranged in the compensating service 565.

In some embodiments, the whole compensating service 565 or one or more of the compensating service segments 620 may be input by a user, for example, the user who designs the service 515. To facilitate the user in generating the compensating service 565 or one or more compensating service segments 620, in some embodiments, a compensating layout may be presented to the user, for example, by the coordinator 520. The compensating layout may indicate a structure of the compensating service 565, and may specifically indicate an order of the sequence of compensating service segments 620. The order of the sequence of compensating segments 620 may be in reverse to an order of the sequence of service segments 610. With the presentation of the compensating layout, it is convenient for the user to input the code snippets to compensate for the corresponding service segments in the service 515.

In some embodiments, the compensating layout may be presented in a similar representation as illustrated in FIG. 6B for the compensating service 565. In some examples, a layout of the service segments 610 in the service 515 may be presented together with the compensating layout, as also illustrated in FIG. 6B. Blanks for the compensating services 630 may be presented and the user may input the code snippets into the corresponding blanks.

Figures 7, 8:
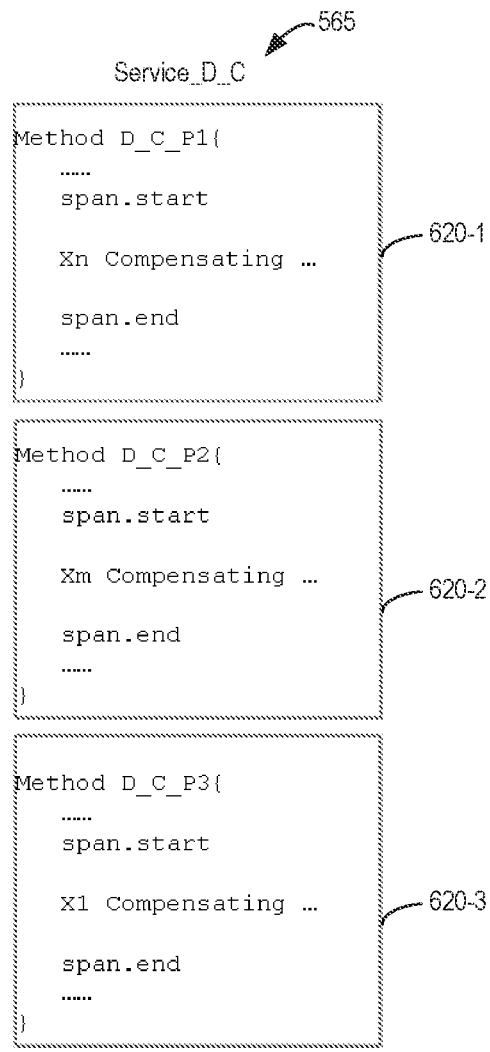
FIG. 7 depicts an example compensating service generated for a service in accordance with some embodiments of the present disclosure.
FIG. 8 depicts example correlations between service segments and compensating service segments in accordance with some embodiments of the present disclosure.

In some embodiments, the coordinator 520 may receive one or more of the sequence of compensating segments 620 input by the user. For example, the user may input the code snippets for one or more compensating service segments 620, for example, via the user terminal, and the input code snippets may then be communicated to the coordinator 520. FIG. 7 depicts an example of the compensating service 565 obtained from the user, where the code snippets in the respective compensating service segments are input and arranged in the order as indicated in the presented compensating layout.

In some embodiments, some automatic code generation approaches may be applied to generate the compensating service 565 or one or more of the compensating services 620 in the compensating service 565. The automatic code generation for the compensating service segments 620 may be based on the service segments 610, in order to compensate for or roll back the operations/actions performed by the service segments 610.

Some embodiments of generating the compensating service 565 for the service 515 have been discussed above. The compensating service 576 for the service 517 which is executed to change the same global variable may be generated in a similar way. Compensating services for other services which are executed to change a value(s) of a global variable(s) may also be generated in a similar way as described above with respect to the service 515.

FIG. 8 depicts correlations between service segments and compensating service segments in accordance with some embodiments, where a table 800 indicates the correlations for the service 515 "Service_D" and a table 810 indicates the correlations for the service 517 "Service_E."

In the tables 800 and 810, a column of "segment name" lists the compensating service segments in sequence, a column of "global var." indicates whether the compensating service segments include a rollback change made to a value of a global variable (in this example, the global variable "x"), and a column of "previous segment" lists the previous compensating service segments located before the corresponding service segments. The table 800 further comprises a column of "compensate for" indicate the service segments 610 to be compensated.

For example, in the table 800, the compensating service segment 620-1 "Service_D_C_P1" is configured to compensate for the service segment 610-3 "Service_D_P3" which spans from code lines 21 to 30 in the service 515 "Service D", the compensating service segment 620-2 "Service_D_C_P2" is configured to compensate for the service segment 610-2 "Service_D_P2" which spans from code lines 11 to 20, and the compensating service segment 620-3

"Service_D_C_P3" is configured to compensate for the service segment 610-3 "Service_D_P1" which spans from code lines 1 to 10. The table 810 indicates similar compensating information for service segments of the service 517 "Service_E" and compensating service segments of its compensating service 567 "Service_E_C."

It would be appreciated that in some embodiments, in addition to a compensating layout generated in a similar representation as illustrated in FIG. 6B, or as an alternative, the tables 800 and/or 810 may also be presented to the user, to indicate a compensating layout of the compensating service segments.

For a service of the transaction 510 which are not executed to change any value of a global variable, e.g., the service 512, 514, or 516, the compensating service may be generated as whole, without separate compensating service segments generated depending on a location of a code snippet executable to change the value of the global variable.

As mentioned above, the compensating services for the services of the transaction 510 may be deployed into the service execution environment 504 and may be executed according to the rollback execution plan 522 based on the tracing information 542 captured during execution of the services.

Figures 9, 10:
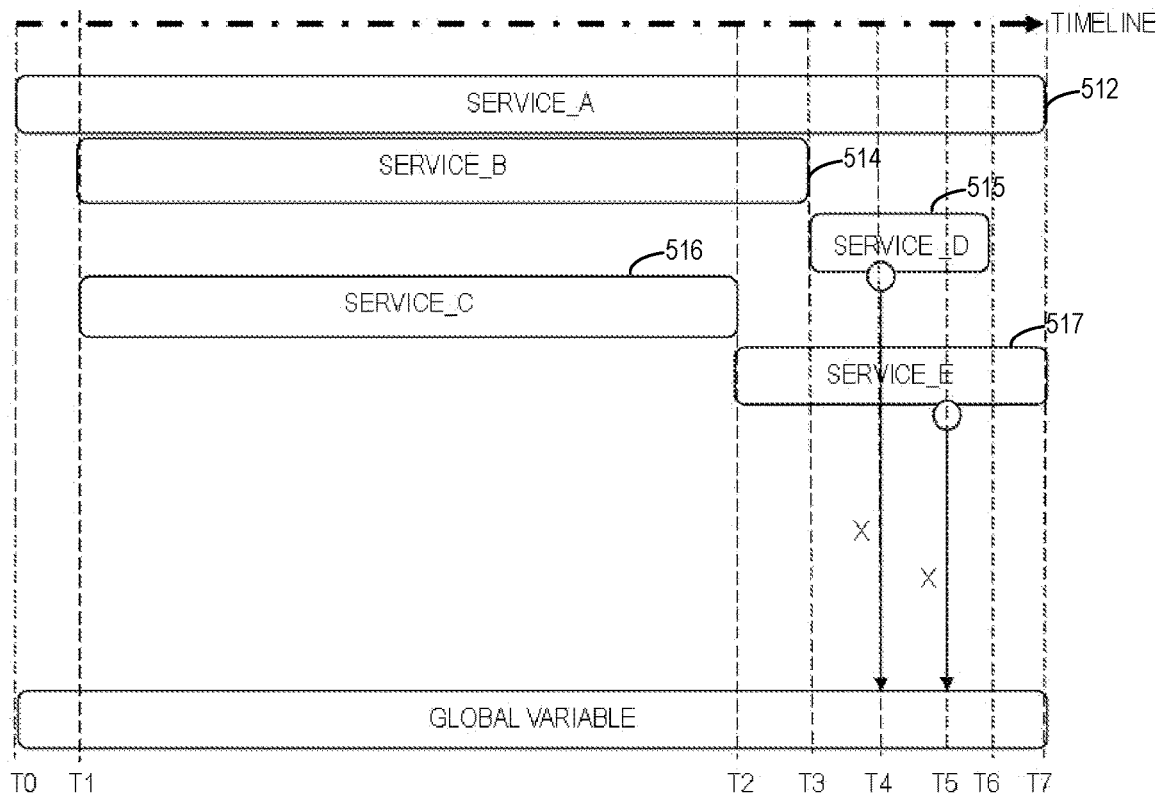
FIG. 9 depicts example execution of services of a transaction in accordance with some embodiments of the present disclosure.
FIG. 10 depicts an example of tracing information in accordance with some embodiments of the present disclosure.

FIG. 9 depicts example execution of services of the transaction 510, during which the tracing information 542 may be captured by the tracing server 540. Time spans of execution of the services are depicted along the timeline in FIG. 9. As illustrated, the service 512 is started at T0 and the services 514 and 516 are then invoked by the service 512 in parallel to execute at T1. The execution of the services 514 and 516 may last for different durations. In the illustrated of FIG. 9, the execution of the service 516 is completed at T2. The execution of the service 514 is completed at T3 which is later than the completion time of the service 516. After the service 514 is completed at T3, the service 515 is invoked and executed to change an initial value of the global variable "x" at T4. After the service 516 is completed, the service 517 is invoked and executed to change the value of the global variable "x" at T5. The execution of the service 515 is completed at T6. The execution of the service 517 is completed at T7. After the services 514, 516, 515, and 517 are all completed, the service 512 is completed.

Depending on the execution of the transaction 510 in the example of FIG. 9, the tracing server 540 may obtain the tracing information 542 as illustrated in FIG. 10, which indicates the timing of the changes made by the two or more services to the global variable(s) during the execution. Specifically, in the example of FIG. 10, a column of "time" indicate the corresponding time points, a column of "segment name" indicates the corresponding compensating services of the transaction (e.g., "Service_D" and "Service_E" in this example), a column of "line" indicates at which code lines of the compensating service segments 620 a "global var. result" is determined, and a column of "global var." indicates which global variable is included in the corresponding service. In addition, a column of "global var. result" indicates whether the global variable "x" is changed at the corresponding times by the corresponding services, and a column of "message" indicates messages received during execution of the services, where the message "global_ var_x_changed" indicates that the value of the corresponding global variable has been changed.

In some embodiments, as the compensating services may be generated to include a sequence of compensating service segments that are invoked independently, the rollback execution plane 542 may be determined to specify the execution order of the compensating service segments. In particular, the execution order of the compensating service segments that are generated to undo the changes made to the global variable may be carefully specified according to the order indicated in the tracing information 542.

Specifically, from the tracing information 542 as illustrated in FIG. 10, it can be determined that the service 515 "Service_D" changes the value of the global variable "x" prior to the service 517 "Service_E." As such, the correct rollback order for the global variable "x" is to first change the value by the compensating service 567 "Service_E_C" and then by the compensating service 565 "Service_D_C." In the compensating services 567 and 565, as can be seen from the tables 800 and 810 in FIG. 8, the compensating service segments "Service_E_C_P2" and "Service_ D_C_P2" are generated to compensate for the service segments of the two services 517 and 515 which are executed to change the value of the global variable "x."

According to the above information, when generating the rollback execution plan 522 to indicate the correct rollback order for the global variable "x," the coordinator 520 may specify in the rollback execution plan 522 that the compensating service segment "Service_E_C_P2" is invoked first and the compensating service segment "Service_D_C_P2" is invoked after the compensating service segment "Service_E_C_P2" is executed to change the value of the global variable "x." In other words, the compensating service segment "Service_D_C_P2" is invoked after a completed execution of the compensating service segment "Service_ E_C_P2."

By configuring the compensating segments, the whole compensating service 565 "Service_D_C" does not have to wait for the completed execution of the whole compensating service 567 "Service_E_C." For example, one or more compensating service segments before the compensating service segment "Service_D_C_P2" may be executed at appropriate times. The invoking condition is applied to the compensating service segment "Service_D_C_P2."

In addition to specify the execution order of the compensating service segments "Service_D_C_P2" and "Service_ E_C_P2," the compensating service segments of a same compensating services may be executed in the order as arranged, and the compensating services may be invoked in parallel if the corresponding services of the transaction 510 are invoked in parallel. The compensating services may be invoked serially in reverse if the corresponding services of the transaction 510 are invoked in serial.

FIG. 11 depicts an example of the rollback execution plan 522 for the compensating services 562, 564, 565, 566, and 567. In this example, a column of "segment/service name" lists the compensating service segments or compensating services, and a column of "previous segment/service" indicates that an invoking condition for a compensating service segment or compensating service in the same row. For example, for the compensating service segments "Service_ D_C_P1" and "Service_E_C_P1," no previous segments are indicated and they can be invoked without requiring an invoking condition to be satisfied.

For the compensating service segment "Service_ E_C_P2," its previous compensating service segment is specified to be the compensating service segment "Service_ E_C_P1" which means that the compensating service segment "Service_E_C_P2" is not invoked until the compensating service segment "Service_E_C_P1" is completely executed. This is reasonable because the compensating service segment "Service_E_C_P1" is located before the compensating service segment "Service_E_C_P2" in the compensating service "Service_E_C."

For the compensating service segment "Service_D_C_P2," its previous compensating service segments are specified to include the compensating service segments "Service_D_C_P1" and "Service_E_C_P2." Thus, the compensating service segment "Service_D_C_P2" is not invoked until the compensating service segment "Service_D_C_P1" is completely executed because this segment is located before the compensating service segment "Service_D_C_P2" in the compensating service "Service_D_C." In addition, the compensating service segment "Service_D_C_P2" may still need to wait for a completed execution of the compensating service segment "Service_E_C_P2," such that the global variable "x" can be changed by the compensating service segment "Service_E_C_P2" before the compensating service segment "Service_D_C_P2." In this way, the rollback order of the global variable "x" is correct.

Figure 12:
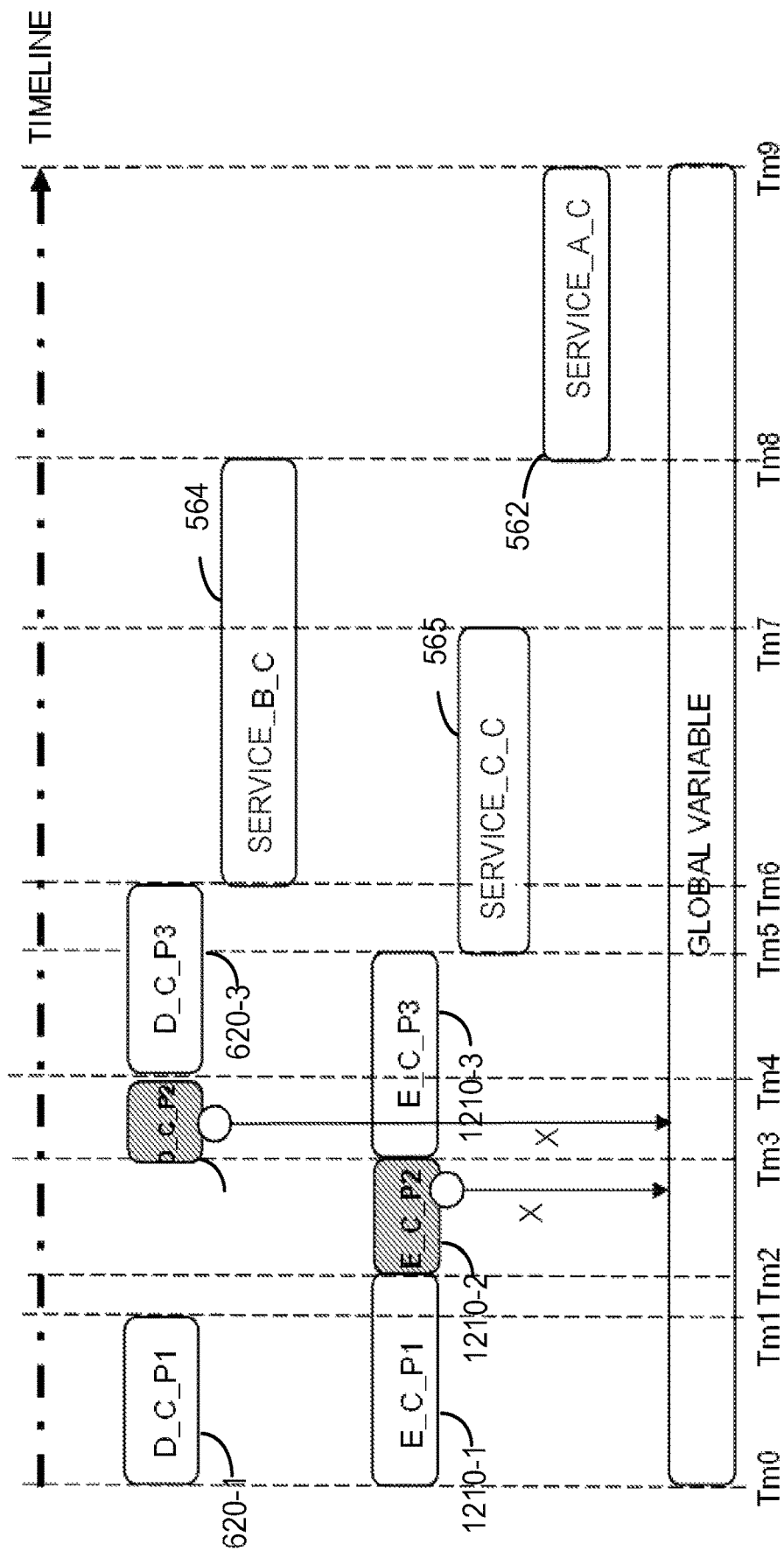
FIG. 12 depicts example rollback execution of compensating services for a transaction in accordance with some embodiments of the present disclosure.

The invoking conditions for other compensating service segments and compensating services are also specifically indicated in the rollback execution plan 522. FIG. 12 depicts example rollback execution of compensating services 562, 564, 565, 566, and 567 performed according to the rollback execution plan 522 as illustrated in FIG. 11. As illustrated, when a rollback for the transaction 510 is started, the compensating service segment 620-1 "Service_D_C_P1" and the compensating service segment 1210-1 "Service_E_C_P1" are invoked to execute at Tm0.

The execution of the compensating service segment 620-1 "Service_D_C_P1" is completed at Tm1. However, the following compensating service segment 620-2 "Service_D_C_P2" in the same compensating service 565 "Service_D_C" is not invoked at Tm0 because the rollback execution plan 522 specify that the compensating service segment 620-1 "Service_D_C_P1" is invoked after a competed execution of the compensating service segment 1210-2 "Service_E_C_P2." The execution of the compensating service segment 1210-1 "Service_E_C_P1" is completed at Tm2 and after that, the compensating service segment 1210-2 "Service_E_C_P2" is invoked to execute. During the execution of the compensating service segment 1210-2 "Service_E_C_P2," the value of the global variable "x" is modified to undo the change applied by the execution of the service 517 "Service_E" (at T5 during the execution of the transaction 510 in FIG. 9).

The execution of the compensating service segment 1210-2 "Service_E_C_P2" is completed at Tm3. At this time, the invoking condition for the compensating service segment 620-2 "Service_D_C_P2" is satisfied according to the rollback execution plan 522. Thus, the compensating service segment 620-2 "Service_D_C_P2" is invoked to execute at Tm3. The compensating service segment 1210-3 "Service_E_C_P3" can also be invoked to execute at Tm3. During the execution of the compensating service segment 620-2 "Service_D_C_P2," the value of the global variable "x" is further modified to undo the change applied by the execution of the service 515 "Service_D" (at T4 during the execution of the transaction 510 in FIG. 9). As such, the changes made to the value of the global variable "x" in during the failed execution of the transaction 510 are recursively applied to the global variable "x" in the rollback process, thereby ensuring rollback of the global variable to its initial state (value). The execution of the compensating service segment 620-2 "Service_D_C_P2" is completed at Tm4.

The other compensating service segments and compensating services may also be invoked and executed according to the rollback execution plan 522, and their invoking times and durations are illustrated in FIG. 12. At Tm8, the compensating service 562 "Service_A_C" is invoked because both the parallel compensating services 564 and 565 are completely executed. At Tm9, the compensating service 562 "Service_A_C" is completed.

In the above examples, the global variable is changed or updated for one time in one service of the transaction 510. In some cases, a same global variable may be changed or updated for more than one time in one or more services of the transaction 510. In such cases, the compensating service segments and the rollback execution plan 522 may also be determined in a similar way. To better understand the embodiments where a global variable is changed for more than one time, reference will be made to examples illustrated in FIGS. 13A-13D. In those examples, it is assumed that a same global variable is detected to be changed twice by the service 515 during the execution of this service, and to be changed twice by the service 517 during the execution.

Figure 13A:
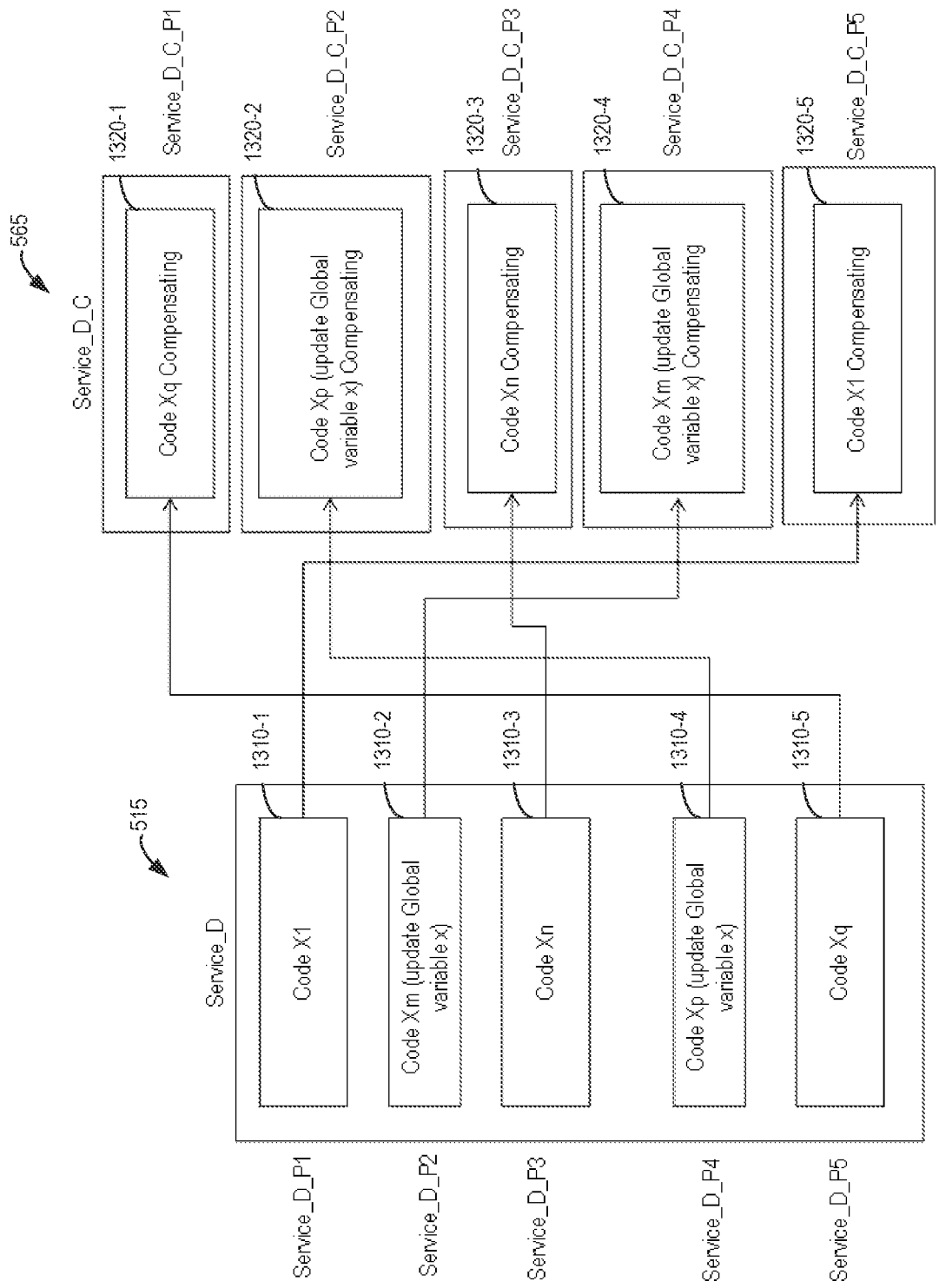
FIG. 13A depicts an example correlation between service segments and compensating service segments in accordance with some other embodiments of the present disclosure.

As illustrated in FIG. 13A, the global checker 530 may detect from the code of the service 515 that the global variable "x" is to be changed twice. Based on the locations of the code snippet where the global variable "x" is defined to be changed, the coordinator 520 may then divide the service 515 into a sequence of service segments 1310-1, 1310-2, 1310-3, 1310-4, and 1310-5, represented as "Service_D_P1," "Service_D_P2," "Service_D_P3," "Service_D_P4," and "Service_D_P5," as illustrated in FIG. 13A. Those service segments 1310-1, 1310-2, 1310-3, 1310-4, and 1310-5 may sometimes be collectively or individually referred to as service segments 1310. Among the service segments 1310, the service segment 1310-2 is configured to change the value of the global variable "x" for a first time and the service segment 1340 is configured to change the value of the global variable "x" for a second time according to the configuration of the service 515.

Accordingly, the compensating service 565 may be determined (automatically or by input from the user) to comprise a sequence of compensating service segments 1320-1, 1320-2, 1320-3, 1320-4, and 1320-5 (sometimes collectively or individually referred to as compensating service segments 1320), represented as "Service_D_C_P1," "Service_D_C_P2," "Service_D_C_P3," "Service_D_C_P4," and "Service_D_C_P5," as illustrated in FIG. 13A. The compensating service segments 1320 are arranged and invoked in reverse order to the service segments 1310, where "Service_D_C_P1" is to compensate for "Service_D_5," "Service_D_C_P2" is to compensate for "Service_D_4," "Service_D_C_P3" is to compensate for "Service_D_3," "Service_D_C_P4" is to compensate for "Service_D_2," and "Service_D_C_P5" is to compensate for "Service_D_1."

The compensating service 567 "Service_E" may also be determined in a similar way, to include a sequence of compensating service segments. The compensating service segments for the compensating service 517 may be represented as "Service_E_C_P1," "Service_E_C_P2," "Service_E_C_P3," "Service_E_C_P4," and "Service_E_C_P5," where "Service_E_C_P2" and "Service_E_C_P4" are configured to compensate for service segments of the service 517 that are executed to change the value of the global variable "x" twice.

Figure 13B:
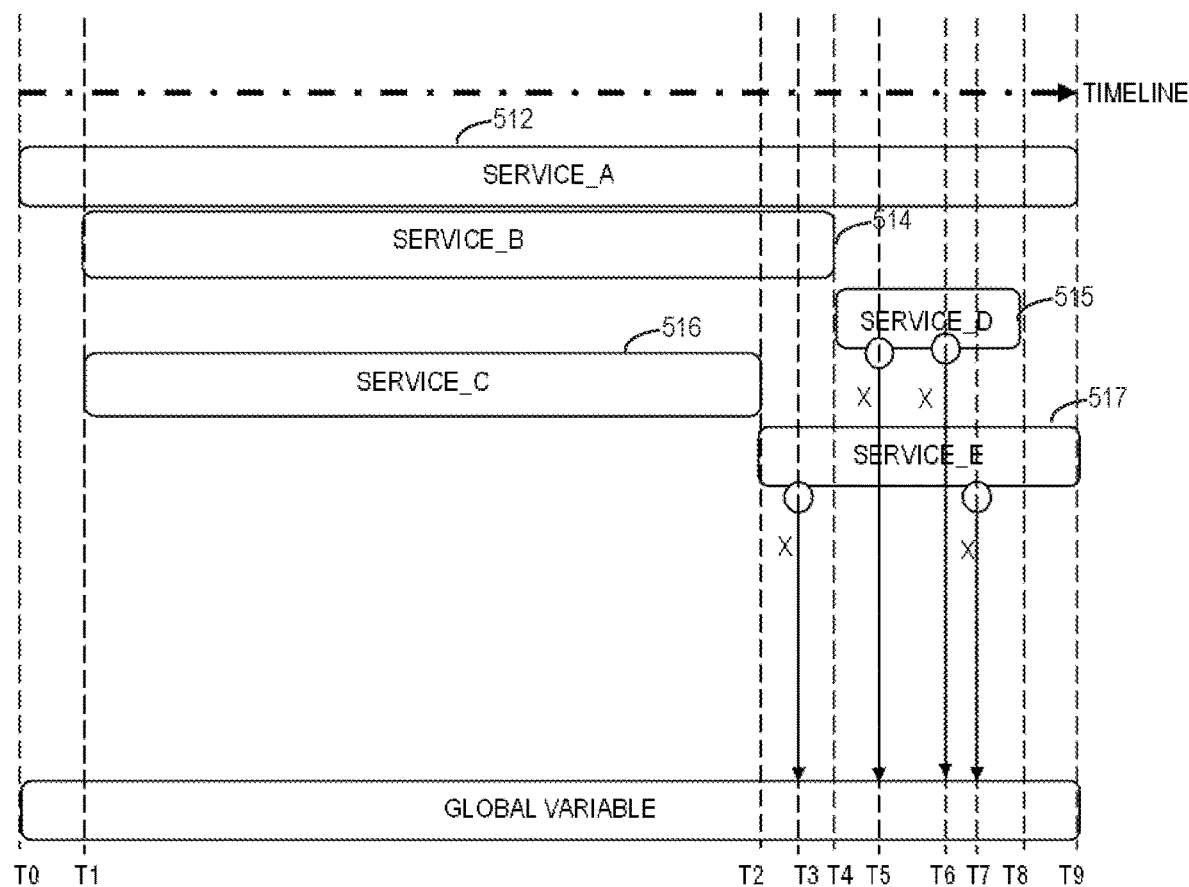
FIG. 13B depicts example execution of services of a transaction in accordance with some other embodiments of the present disclosure.

FIG. 13B depicts example execution of services of the transaction 510, where time spans of execution of the services are depicted along the timeline. As illustrated, the service 517 is invoked at T2 and executed to change an initial value of the global variable "x" at T3 for a first time within the service. The service 515 is invoked at T4 and executed to change an initial value of the global variable "x" at T5 for a first time within the service. The service 515 continues to be executed to change the value of the global variable "x" at T6 for a second time within the service. The service 517 continues to be executed to change the value of the global variable "x" at T7 (which is later than T6). The execution of the service 515 is completed at T8 and the execution of the service 517 is completed at T9. The execution of the service 515 is completed at T9 after the services 514, 516, 515, and 517 are all completed.

During the execution in the example of FIG. 13B, the value of the global variable "x" is changed in sequence at T3 by the service 517, at T5 and T6 by the service 515, and at T7 by the service 517. The tracing server 540 may track and record the order of the changes applied to the global variable "x" in the tracing information 542. According to the tracking information 542, the coordinator 520 may generate the rollback execution plan 522 to perform a rollback for the transaction 510 in the case of a failure of the execution as illustrated in FIG. 13B.

FIG. 13C depicts an example of the rollback execution plan 522 generated based on the tracing information 542 tracked during the execution as illustrated in FIG. 13B. In the rollback execution plan 522 of FIG. 13C, among others, the previous compensating service segments for the compensating service segment "Service_D_C_P2" are specified to include the compensating service segments "Service_D_C_P1" and "Service_E_C_P2." Thus, the compensating service segment "Service_D_C_P2" is invoked after completed execution of both the compensating service segments "Service_D_C_P1" and "Service_E_C_P2".

In addition, the compensating service segment "Service_D_C_P4" is specified to be invoked after the compensating service segment "Service_D_C_P3" and thus also after compensating service segment "Service_D_C_P2. For the compensating service segment "Service_E_C_P4," its previous compensating service segments are specified to include the compensating service segments "Service_E_C_P3" and "Service_D_C_P4." Thus, the compensating service segment "Service_E_C_P4" is invoked after completed execution of both the compensating service segments "Service_E_C_P3" and "Service_D_C_P4".

Figure 13D:
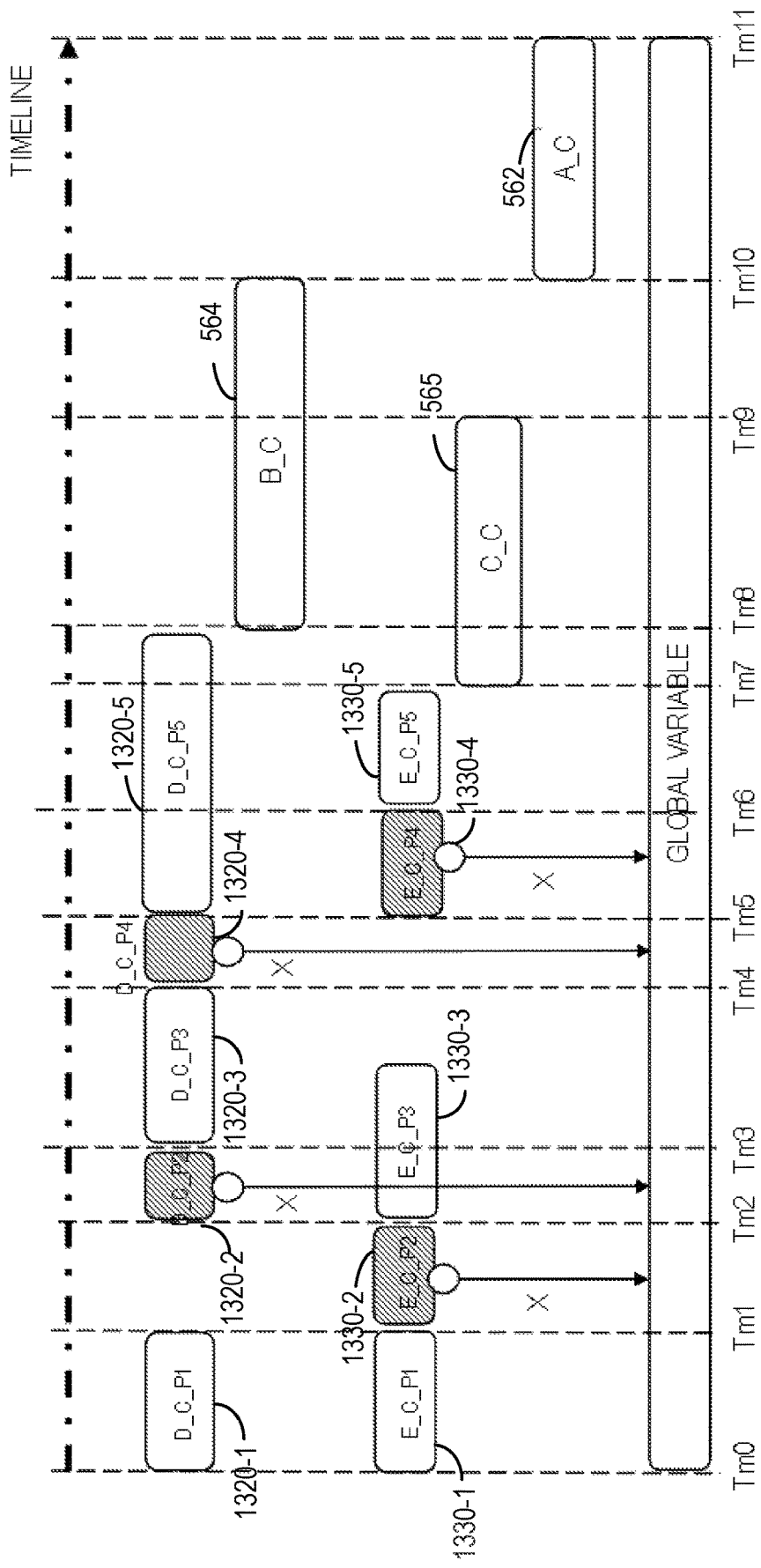
FIG. 13D depicts example rollback execution of compensating services for a transaction in accordance with some other embodiments of the present disclosure.

FIG. 13D depicts example rollback execution of compensating services 562, 564, 565, 566, and 567 performed according to the rollback execution plan 522 as illustrated in FIG. 13B. As illustrated, the compensating service segment 1330-2 "Service_E_C_P2" is invoked at Tm1 after the compensating service segment 1330-1 "Service_E_C_P1" is completely executed. During the execution of "Service_E_C_P2," the value of the global variable "x" is changed to compensate for the second change made to this global variable during execution of the service 517 "Service_E".

The compensating service segment 1320-2 "Service_D_C_P2" is invoked at Tm2 after the compensating service segment 1320-1 "Service_D_C_P1" and the compensating service segment 1330-2 "Service_E_C_P2" are completely executed. During the execution of "Service_D_C_P2," the value of the global variable "x" is changed to compensate for the second change made to this global variable during execution of the service 515 "Service_D".

The compensating service segment 1320-4 "Service_D_C_P4" is invoked at Tm4 after the compensating service segment 1320-3 "Service_D_C_P3" is completely executed. During the execution of "Service_D_C_P4," the value of the global variable "x" is changed to compensate for the first change made to this global variable during execution of the service 515 "Service_D".

The compensating service segment 1330-4 "Service_D_C_P4" is invoked at Tm5 after the compensating service segment 1330-3 "Service_E_C_P3" and the compensating service segment 1320-4 "Service_D_C_P4" are completely executed. During the execution of "Service_D_C_P4," the value of the global variable "x" is changed to compensate for the first change made to this global variable during execution of the service 517 "Service_E".

During the rollback execution in the example of FIG. 13D, the value of the global variable "x" is rolled back in sequence by the compensating service segments "Service_E_C_P2," "Service_D_C_P2," "Service_D_C_P4," and "Service_E_C_P4." The other compensating service segments and compensating services may also be invoked and executed according to the rollback execution plan 522, and their invoking times and durations are illustrated in FIG. 13D.

In some cases, two or more global variables may be changed or updated for one or more times in the services of the transaction 510. The same or different services may be executed to change the two or more global variables. In such cases, the compensating service segments and the rollback execution plan 522 may also be determined in a similar way. To better understand the embodiments where a global variable is changed for more than one time, reference will be made to examples illustrated in FIGS. 14A-14D. In those examples, it is assumed that two global variables "x" and "y" are detected to be changed by the services 515 and the service 517. However, it would be appreciated that it is possible that the same global variables "x" and "y" are detected to be changed by other different services.

Figure 14A:
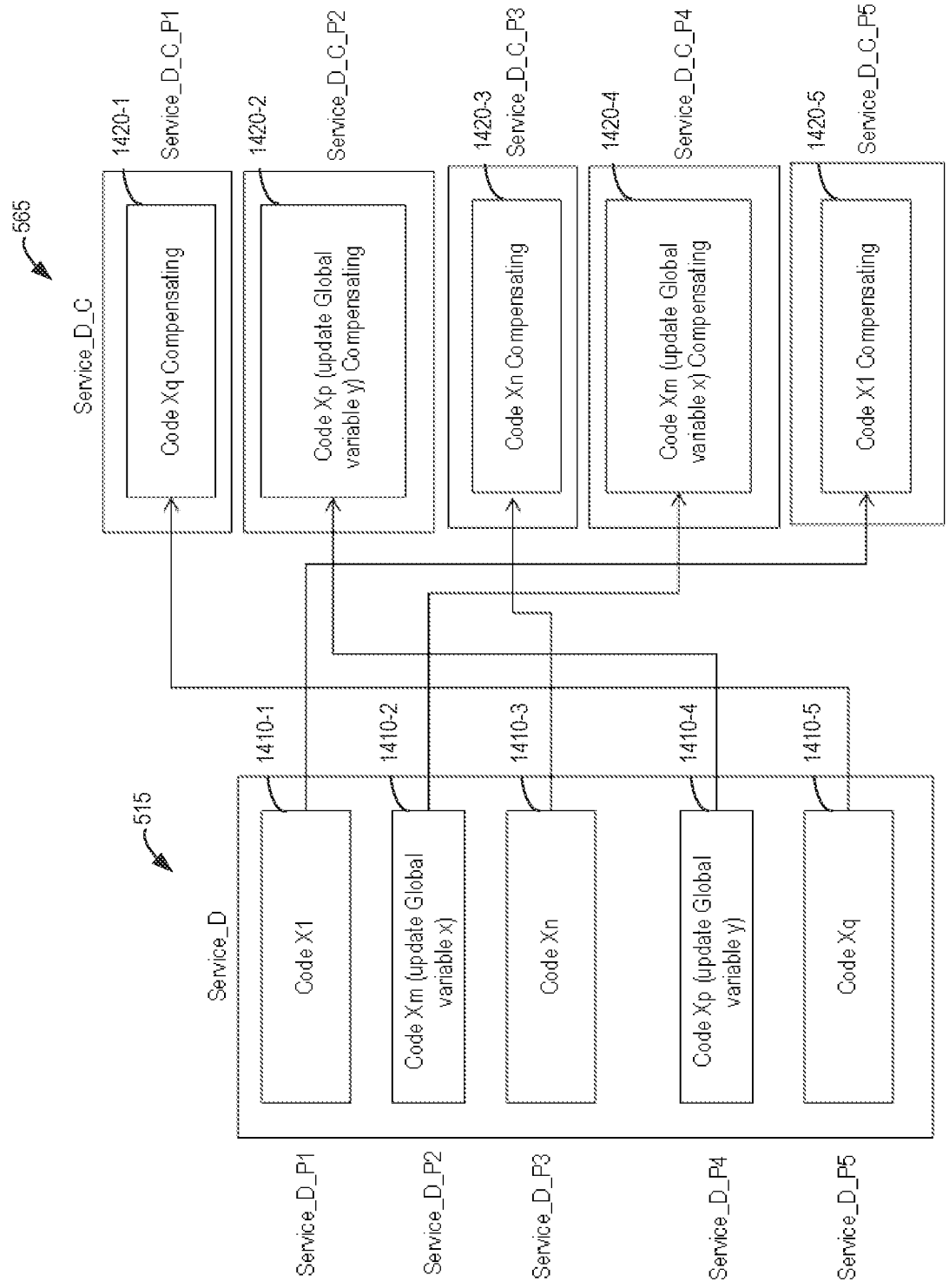
FIG. 14A depicts an example correlation between service segments and compensating service segments in accordance with some further embodiments of the present disclosure.

As illustrated in FIG. 14A, the global checker 530 may detect from the code of the service 515 that two global variables "x" and "y" are to be changed in the service 515. Based on the locations of the code snippet where the global variables "x" and "y" are defined to be changed, the coordinator 520 may then divide the service 515 into a sequence of service segments 1410-1, 1410-2, 1410-3, 1410-4, and 1410-5, represented as "Service_D_P1," "Service_D_P2," "Service_D_P3," "Service_D_P4," and "Service_D_P5," as illustrated in FIG. 14A. Those service segments 1410-1, 1410-2, 1410-3, 1410-4, and 1410-5 may sometimes be collectively or individually referred to as service segments 1410. Among the service segments 1410, the service segment 1410-2 is configured to change the value of the global variable "x" and the service segment 1440 is configured to change the value of the global variable "y".

Accordingly, the compensating service 565 may be determined (automatically or by input from the user) to comprise a sequence of compensating service segments 1420-1, 1420-2, 1420-3, 1420-4, and 1420-5 (sometimes collectively or individually referred to as compensating service segments 1420), represented as "Service_D_C_P1," "Service_D_C_P2," "Service_D_C_P3," "Service_D_C_P4," and "Service_D_C_P5," as illustrated in FIG. 14A. The compensating service segments 1420 are arranged in reverse order to the service segments 1410, where "Service_D_C_P1" is to compensate for "Service_D_5," "Service_D_C_P2" is to compensate for "Service_D_4," "Service_D_C_P3" is to compensate for "Service_D_3," "Service_D_C_P4" is to compensate for "Service_D_2," and "Service_D_C_P5" is to compensate for "Service_D_1".

The compensating service 567 "Service_E" may also be determined in a similar way, to include a sequence of compensating service segments. The compensating service segments for the compensating service 517 may be represented as "Service_E_C_P1," "Service_E_C_P2," "Service_ E_C_P3," "Service_E_C_P4," and "Service_ E_C_P5," where "Service_E_C_P2" and "Service_ E_C_P4" are configured to compensate for service segments of the service 517 that are executed to change the value of the global variable "x" and the value of the global variable "y," respectively.

Figure 14B:
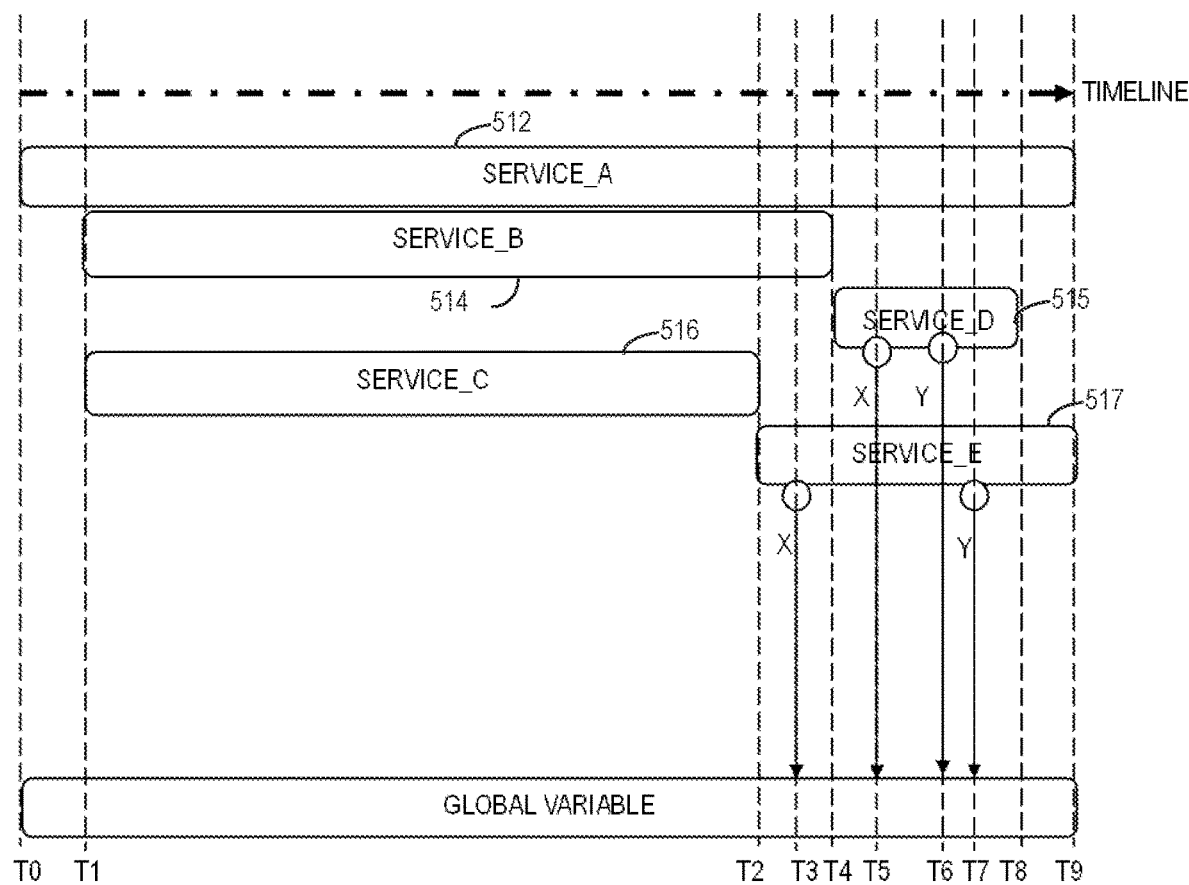
FIG. 14B depicts example execution of services of a transaction in accordance with some further embodiments of the present disclosure.

FIG. 14B depicts example execution of services of the transaction 510, where time spans of execution of the services are depicted along the timeline. As illustrated, the service 517 is invoked at T2 and executed to change an initial value of the global variable "x" at T3 for a first time. The service 515 is invoked at T4 and executed to change an initial value of the global variable "x" at T5 again. The service 515 continues to be executed to change the value of the global variable "y" at T6 for a first time. The service 517 continues to be executed to change the value of the global variable "y" at T7 for a second time. The execution of the service 515 is completed at T8 and the execution of the service 517 is completed at T9. The execution of the service 515 is completed at T9 after the services 514, 516, 515, and 517 are all completed.

During the execution in the example of FIG. 14B, the value of the global variable "x" is changed in sequence at T3 by the service 517 and at T5 by the service 515, while the value of the global variable "y" is changed in sequence at T6 by the service 515 and at T7 by the service 517. The tracing server 540 may track and record the order of the changes applied to the global variable "x" in the tracing information 542. According to the tracking information 542, the coordinator 520 may generate the rollback execution plan 522 to perform a rollback for the transaction 510 in the case of a failure of the execution as illustrated in FIG. 14B.

FIG. 14C depicts an example of the rollback execution plan 522 generated based on the tracing information 542 tracked during the execution as illustrated in FIG. 14B. In the rollback execution plan 522 of FIG. 14C, among others, the previous compensating service segments for the compensating service segment "Service_D_C_P2" are specified to include the compensating service segments "Service_ D_C_P1" and "Service_E_C_P2." Thus, the compensating service segment "Service_D_C_P2" is invoked after completed execution of both the compensating service segments "Service_D_C_P1" and "Service_E_C_P2," so as to ensure the correct rollback order for the global variable "y".

In addition, the compensating service segment "Service_ D_C_P4" is specified to be invoked after the compensating service segment "Service_D_C_P3." For the compensating service segment "Service_E_C_P4," its previous compensating service segments are specified to include the compensating service segments "Service_E_C_P3" and "Service_D_C_P4." Thus, the compensating service segment "Service_E_C_P4" is invoked after completed execution of both the compensating service segments "Service_E_C_P3" and "Service_D_C_P4," so as to ensure the correct rollback order for the global variable "x".

Figure 14D:
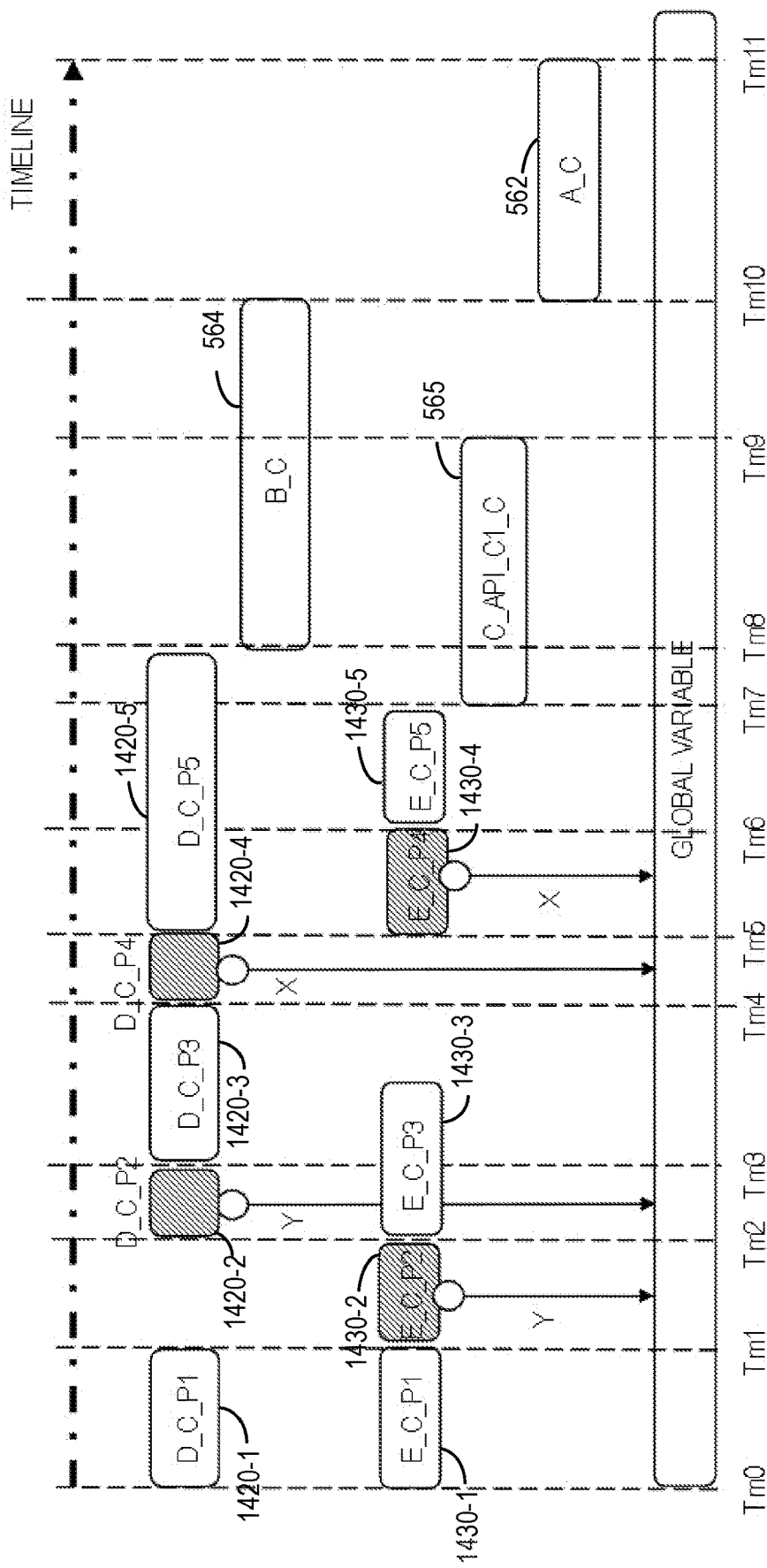
FIG. 14D depicts example rollback execution of compensating services for a transaction in accordance with some further embodiments of the present disclosure.

FIG. 14D depicts example rollback execution of compensating services 562, 564, 565, 566, and 567 performed according to the rollback execution plan 522 as illustrated in FIG. 14B. As illustrated, the compensating service segment 1430-2 "Service_E_C_P2" is invoked at Tm1 after the compensating service segment 1430-1 "Service_E_C_P1" is completely executed. During the execution of "Service_ E_C_P2," the value of the global variable "y" is changed to compensate for the second change made to this global variable during execution of the service 517 "Service_E".

The compensating service segment 1420-2 "Service_ D_C_P2" is invoked at Tm2 after the compensating service segment 1420-1 "Service_D_C_P1" and the compensating service segment 1430-2 "Service_E_C_P2" are completely executed. During the execution of "Service_D_C_P2," the value of the global variable "y" is changed to compensate for the first change made to this global variable during execution of the service 515 "Service_D".

The compensating service segment 1420-4 "Service_ D_C_P4" is invoked at Tm4 after the compensating service segment 1420-3 "Service_D_C_P3" is completely executed. During the execution of "Service_D_C_P4," the value of the global variable "x" is changed to compensate for the second change made to this global variable during execution of the service 515 "Service_D".

The compensating service segment 1430-4 "Service_ D_C_P4" is invoked at Tm5 after the compensating service segment 1430-3 "Service_E_C_P3" and the compensating service segment 1420-4 "Service_D_C_P4" are completely executed. During the execution of "Service_D_C_P4," the value of the global variable "x" is changed to compensate for the first change made to this global variable during execution of the service 517 "Service_E". At Tm6, compensating service segment 1430-5 "Service_E_C_P5" is invoked after the compensating service segment 1430-5 "Service_ E_C_P5" is completely executed.

During the rollback execution in the example of FIG. 14D, the value of the global variable "y" is rolled back in sequence by the compensating service segments "Service_ E_C_P2" and "Service_D_C_P2," while the value of the global variable "x" is rolled back in sequence by the compensating service segments "Service_D_C_P4" and "Service_E_C_P4." The other compensating service segments and compensating services may also be invoked and executed according to the rollback execution plan 522, and their invoking times and durations are illustrated in FIG. 14D.

It would be appreciated that although a value of a global variable is changed in two services in the examples illustrated and discussed above, in other examples, a same global variable may be changed in more than two services. In addition, in some examples, a same global variable may be updated for more than two times within a single service, and more than two different global variables may be detected from services of a transaction. In some alternative cases, a rollback execution plan may also be determined and the compensating services may be generated to execute in a similar way as discussed above.

Figure 15:
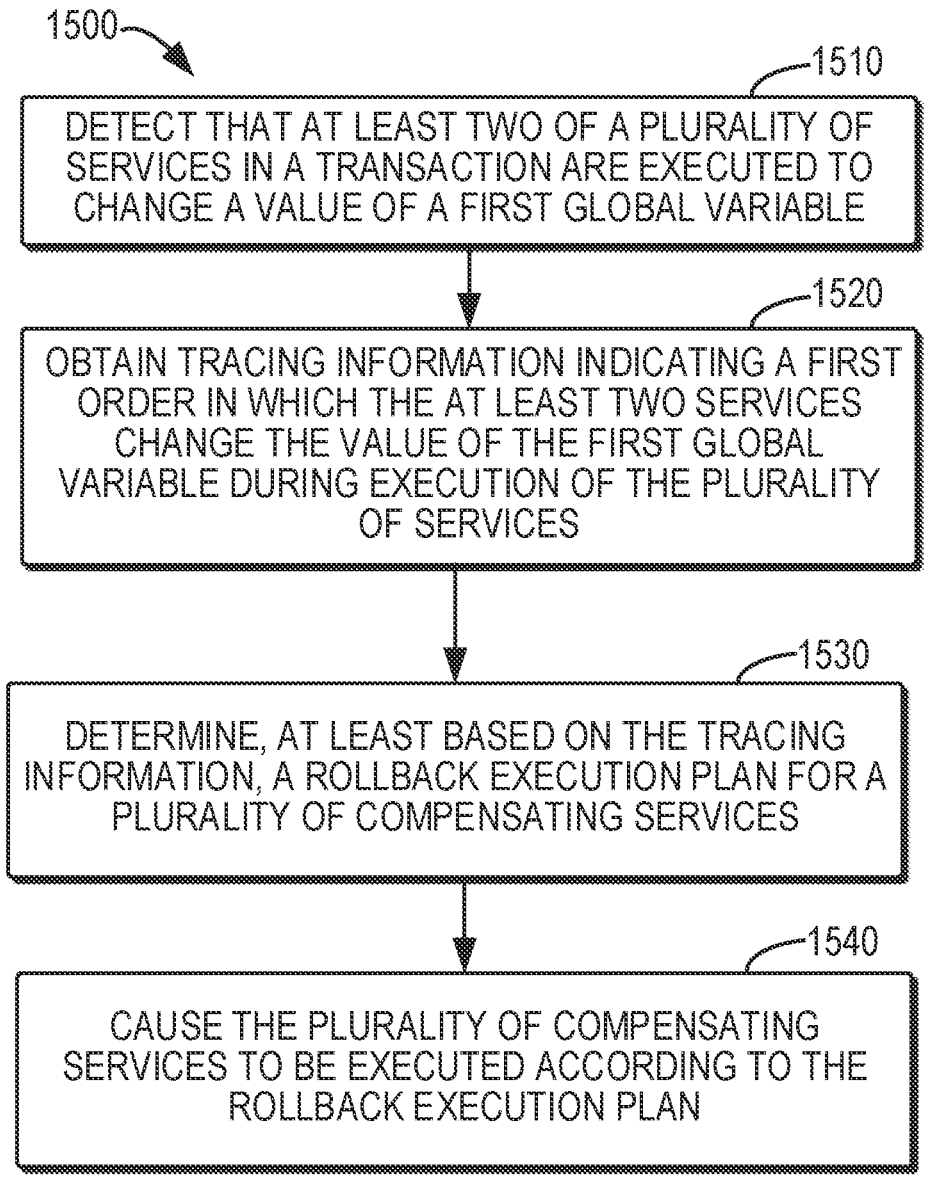
FIG. 15 depicts a flowchart of an example method in accordance with some embodiments of the present disclosure.

FIG. 15 shows a flowchart of an example method 1500 in accordance with some embodiments of the present disclosure. The method 1500 can be implemented at the service management system 502 as shown in FIG. 5. For the purpose of discussion, the method 1500 will be described with reference to FIG. 5.

At block 1510, the service management system 502 detects that at least two of a plurality of services in a transaction are executed to change a value of a first global variable. At block 1520, the service management system 502 obtains tracing information indicating a first order in which the at least two services change the value of the first global variable during execution of the plurality of services. At block 1530, in response to a failure of the transaction, the service management system 502 determines, at least based on the tracing information, a rollback execution plan for a plurality of compensating services. The plurality of compensating services are configured to compensate for the plurality of services respectively. At block 1540, the service management system 502 causes the plurality of compensating services to be executed according to the rollback execution plan.

In some embodiments, determining the rollback execution plan comprises: determining, at least based on the tracing information, the rollback execution plan to specify a second order in which at least two of the plurality of compensating services are executed to change the value of the first global variable, the second order and the first order being reverse.

In some embodiments, the method further comprises: for a first service of the at least two services, dividing the first service into a first sequence of service segments, a first service segment in the first sequence of service segments executed to change the value of the first global variable; and determining a first compensating service among the plurality of compensating services based on the first sequence of service segments. In some embodiments, the first compensating service comprises a first sequence of compensating service segments to be invoked independently to compensate for the first sequence of service segments, respectively.

In some embodiments, determining the first compensating service comprises: presenting, to a user, a layout of the first sequence of compensating service segments, the first sequence of compensating service segments being in a reverse order to the first sequence of service segments; and receiving input by the user for at least one of the first sequence of compensating services.

In some embodiments, a first compensating service segment in the first sequence of compensating service segments is determined to compensate for the first service segment. In some embodiments, determining the rollback execution plan comprises: in response to the tracing information indicating that the first service changes the value of the first global variable prior to a second service of the plurality of services, generating the rollback execution plan to specify that the first compensating service segment of the first compensating service is to be invoked after a completed execution of a compensating service segment of a second compensating service among the plurality of compensating services. In some embodiments, the compensating service segment of the second compensating service is determined to compensate for a service segment of the second service in which the value of the first global variable is changed.

In some embodiments, the first service segment changes the value of the first global variable for a first time, and wherein dividing the first service comprises: identifying, from the first service, a second service segment that is executed to change the value of the first global variable for a second time after the first service segment; and dividing the first service into the first sequence of service segments further based on a location of the second service segment, the first sequence of service segments comprising the second service segment. In some embodiments, the first compensating service is determined to further comprise a second compensating service segment to compensate for the second service segment, the second compensating service segment being invoked prior to the first compensating service segment.

In some embodiments, determining the rollback execution plan comprises: in response to the tracing information further indicating that a third service of the plurality of services changes the value of the first global variable prior to the first service, generating the rollback execution plan to further specify that a compensating service segment of a third compensating service of the plurality of compensating services is to be invoked after a completed execution of the first and second compensating service segments of the first compensating service. In some embodiments, the compensating service segment of the third compensating service is determined to compensate for a service segment of the third service in which the value of the first global variable is changed.

In some embodiments, dividing the first service comprises: in accordance with a determination that the first service and at least one further service of the plurality of services are executed to change a value of a second global variable, identifying a third service segment from the first service that is executed to change the value of the second global variable; and dividing, by one or more processors, the first service into the first sequence of service segments further based on a location of the third service segment in the first service, the first sequence of service segments comprising the third service segment. In some embodiments, the first compensating service is determined to comprise a third compensating service segment to compensate for the third service segment.

In some embodiments, the tracing information further indicates a third order in which the first service and the at least one further service change the value of the second global variable. In some embodiments, determining the rollback execution plan comprises: in response to the third order indicating that the first service changes the value of the second global variable prior to a fourth service of the at least one further service, generating the rollback execution plan to further specify that the third compensating service segment of the first compensating service is to be invoked after a completed execution of a compensating service segment of a fourth compensating service among the plurality of compensating services. In some embodiments, the compensating service segment of the fourth compensating service is determined to compensate for a service segment of the fourth service in which the value of the second global variable is changed.

It should be noted that the processing of rollback of services with a global variable change or the service management system 502 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting, by one or more processors, that at least two of a plurality of services in a transaction are executed to change a value of a first global variable;
    obtaining, by the one or more processors, tracing information indicating a first order in which the at least two services change the value of the first global variable during execution of the plurality of services;
    in response to a failure of the transaction, determining, by the one or more processors, a rollback execution plan for a plurality of compensating services based, at least in part, on the tracing information, the plurality of compensating services being configured to compensate for the plurality of services respectively; and causing, by the one or more processors, the plurality of compensating services to be executed according to the rollback execution plan.

2. The method of claim 1, wherein determining the rollback execution plan comprises:
  determining, by the one or more processors, the rollback execution plan based, at least in part, on the tracing information to specify a second order in which at least two of the plurality of compensating services are executed to change the value of the first global variable, the second order and the first order being reverse.

3. The method of claim 1, further comprising: for a first service of the at least two services,
  dividing, by the one or more processors, the first service into a first sequence of service segments, a first service segment in the first sequence of service segments executed to change the value of the first global variable; and
  determining, by the one or more processors, a first compensating service among the plurality of compensating services based on the first sequence of service segments,
  wherein the first compensating service comprises a first sequence of compensating service segments to be invoked independently to compensate for the first sequence of service segments, respectively.

4. The method of claim 3, wherein determining the first compensating service comprises:
  presenting, by the one or more processors, a layout of the first sequence of compensating service segments to a user, the first sequence of compensating service segments being in a reverse order to the first sequence of service segments; and
  receiving, by the one or more processors, input by the user for at least one of the first sequence of compensating services.

5. The method of claim 3, wherein a first compensating service segment in the first sequence of compensating service segments is determined to compensate for the first service segment, and wherein determining the rollback execution plan comprises:
  in response to the tracing information indicating that the first service changes the value of the first global variable prior to a second service of the plurality of services,
    generating, by the one or more processors, the rollback execution plan to specify that the first compensating service segment of the first compensating service is to be invoked after a completed execution of a compensating service segment of a second compensating service among the plurality of compensating services,
    wherein the compensating service segment of the second compensating service is determined to compensate for a service segment of the second service in which the value of the first global variable is changed.

6. The method of claim 3, wherein the first service segment changes the value of the first global variable for a first time, and wherein dividing the first service comprises:
  identifying, by the one or more processors, a second service segment from the first service that is executed to change the value of the first global variable for a second time after the first service segment; and
  dividing, by the one or more processors, the first service into the first sequence of service segments further based on a location of the second service segment, the first sequence of service segments comprising the second service segment, and
  wherein the first compensating service is determined to further comprise a second compensating service segment to compensate for the second service segment, the second compensating service segment being invoked prior to the first compensating service segment.

7. The method of claim 6, wherein determining the rollback execution plan comprises:
  in response to the tracing information further indicating that a third service of the plurality of services changes the value of the first global variable prior to the first service,
    generating, by the one or more processors, the rollback execution plan to further specify that a compensating service segment of a third compensating service of the plurality of compensating services is to be invoked after a completed execution of the first and second compensating service segments of the first compensating service,
    wherein the compensating service segment of the third compensating service is determined to compensate for a service segment of the third service in which the value of the first global variable is changed.

8. The method of claim 3, wherein dividing the first service comprises:
  in accordance with a determination that the first service and at least one further service of the plurality of services are executed to change a value of a second global variable, identifying, by the one or more processors, a third service segment from the first service that is executed to change the value of the second global variable; and
  dividing, by the one or more processors, the first service into the first sequence of service segments further based on a location of the third service segment in the first service, the first sequence of service segments comprising the third service segment, and
  wherein the first compensating service is determined to comprise a third compensating service segment to compensate for the third service segment.

9. The method of claim 8, wherein the tracing information further indicates a third order in which the first service and the at least one further service change the value of the second global variable, and wherein determining the rollback execution plan comprises:
  in response to the third order indicating that the first service changes the value of the second global variable prior to a fourth service of the at least one further service,
    generating, by the one or more processors, the rollback execution plan to further specify that the third compensating service segment of the first compensating service is to be invoked after a completed execution of a compensating service segment of a fourth compensating service among the plurality of compensating services,
    wherein the compensating service segment of the fourth compensating service is determined to compensate for a service segment of the fourth service in which the value of the second global variable is changed.

10. A system comprising:
a processing unit; and
a memory coupled to the processing unit and storing instructions thereon, the instructions, when executed by the processing unit, performing operations including:
detecting that at least two of a plurality of services in a transaction are executed to change a value of a first global variable;
obtaining tracing information indicating a first order in which the at least two services change the value of the first global variable during execution of the plurality of services;
in response to a failure of the transaction, determining a rollback execution plan for a plurality of compensating services based, at least in part, on the tracing information, the plurality of compensating services being configured to compensate for the plurality of services respectively; and
causing the plurality of compensating services to be executed according to the rollback execution plan.

11. The system of claim 10, wherein determining the rollback execution plan comprises:
determining, at least based on the tracing information, the rollback execution plan to specify a second order in which at least two of the plurality of compensating services are executed to change the value of the first global variable, the second order and the first order being reverse.

12. The system of claim 10, wherein the operations further comprise: for a first service of the at least two services,
dividing the first service into a first sequence of service segments, a first service segment in the first sequence of service segments executed to change the value of the first global variable; and
determining a first compensating service among the plurality of compensating services based on the first sequence of service segments,
wherein the first compensating service comprises a first sequence of compensating service segments to be invoked independently to compensate for the first sequence of service segments, respectively.

13. The system of claim 12, wherein determining the first compensating service comprises:
presenting, to a user, a layout of the first sequence of compensating service segments, the first sequence of compensating service segments being in a reverse order to the first sequence of service segments; and
receiving input by the user for at least one of the first sequence of compensating services.

14. The system of claim 12, wherein a first compensating service segment in the first sequence of compensating service segments is determined to compensate for the first service segment, and wherein determining the rollback execution plan comprises:
in response to the tracing information indicating that the first service changes the value of the first global variable prior to a second service of the plurality of services,
generating the rollback execution plan to specify that the first compensating service segment of the first compensating service is to be invoked after a completed execution of a compensating service segment of a second compensating service among the plurality of compensating services,
wherein the compensating service segment of the second compensating service is determined to compensate for a service segment of the second service in which the value of the first global variable is changed.

15. The system of claim 12, wherein the first service segment changes the value of the first global variable for a first time, and wherein dividing the first service comprises:
identifying, from the first service, a second service segment that is executed to change the value of the first global variable for a second time after the first service segment; and
dividing the first service into the first sequence of service segments further based on a location of the second service segment, the first sequence of service segments comprising the second service segment, and
wherein the first compensating service is determined to comprise a second compensating service segment to compensate for the second service segment, the second compensating service segment being invoked prior to the first compensating service segment.

16. The system of claim 15, wherein determining the rollback execution plan comprises:
in response to the tracing information indicating that a third service of the plurality of services changes the value of the first global variable prior to the first service,
generating the rollback execution plan to specify that a compensating service segment of a third compensating service of the plurality of compensating services is to be invoked after a completed execution of the first and second compensating service segments of the first compensating service,
wherein the compensating service segment of the third compensating service is determined to further compensate for a service segment of the third service in which the value of the first global variable is changed.

17. The system of claim 12, wherein dividing the first service comprises:
in accordance with a determination that the first service and at least one further service of the plurality of services are executed to change a value of a second global variable, identifying a third service segment from the first service that is executed to change the value of the second global variable; and
dividing, by one or more processors, the first service into the first sequence of service segments further based on a location of the third service segment in the first service, the first sequence of service segments comprising the third service segment, and
wherein the first compensating service is determined to comprise a third compensating service segment to compensate for the third service segment.

18. The system of claim 17, wherein the tracing information further indicates a third order in which the first service and the at least one further service change the value of the second global variable, and wherein determining the rollback execution plan comprises:
in response to the third order indicating that the first service changes the value of the second global variable prior to a fourth service of the at least one further service,
generating the rollback execution plan to further specify that the third compensating service segment of the first compensating service is to be invoked after a completed execution of a compensating service segment of a fourth compensating service among the plurality of compensating services, wherein the compensating service segment of the fourth compensating service is determined to compensate for a service segment of the fourth service in which the value of the second global variable is changed.

19. A computer program product, the computer program product comprising a computer readable storage medium having program instructions embodied therewith, the program instructions executable by an electronic device to cause the electronic device to perform operations comprising:
  detecting that at least two of a plurality of services in a transaction are executed to change a value of a first global variable;
  obtaining tracing information indicating a first order in which the at least two services change the value of the first global variable during execution of the plurality of services;
  in response to a failure of the transaction, determining a rollback execution plan for a plurality of compensating services based, at least in part, on the tracing information, the plurality of compensating services being configured to compensate for the plurality of services respectively; and
  causing the plurality of compensating services to be executed according to the rollback execution plan.

20. The computer program product of claim 19, wherein determining the rollback execution plan comprises:
  determining, at least based on the tracing information, the rollback execution plan to specify a second order in which at least two of the plurality of compensating services are executed to change the value of the first global variable, the second order and the first order being reverse.

* * * * *